United States Patent
Fukuda et al.

(10) Patent No.: US 9,411,968 B2
(45) Date of Patent: Aug. 9, 2016

(54) APPARATUS AND METHOD FOR PERFORMING DIFFERENT CRYPTOGRAPHIC ALGORITHMS IN A COMMUNICATION SYSTEM

(71) Applicant: FUJITSU LIMITED, Kawasaki-shi, Kanagawa (JP)

(72) Inventors: Isamu Fukuda, Yokohama (JP); Shigeaki Kawamata, Sagamihara (JP); Jun Roppongi, Yokohama (JP); Akihiro Kameda, Kawasaki (JP); Kazuyuki Minohara, Sagamihara (JP); Nobuyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 81 days.

(21) Appl. No.: 14/015,422

(22) Filed: Aug. 30, 2013

(65) Prior Publication Data
US 2014/0136853 A1    May 15, 2014

(30) Foreign Application Priority Data

Nov. 14, 2012    (JP) .................. 2012-250276

(51) Int. Cl.
*G06F 21/60* (2013.01)
*H04L 29/06* (2006.01)

(52) U.S. Cl.
CPC .......... *G06F 21/602* (2013.01); *H04L 63/0428* (2013.01); *H04L 63/205* (2013.01)

(58) Field of Classification Search
CPC .. H04L 63/205; H04L 63/0428; G06F 21/602
See application file for complete search history.

(56) References Cited

U.S. PATENT DOCUMENTS 7,421,583 B1 *  9/2008  Berson ................ G06Q 20/085
                                                           380/255
7,826,360 B1 * 11/2010  Hutchison ..................... 370/230
(Continued)

FOREIGN PATENT DOCUMENTS

| JP | 2001-177516 A | 6/2001 |
| JP | 2005-117232 A | 4/2005 |
| WO | WO 2006/115252 A1 | 11/2006 |

OTHER PUBLICATIONS

C. Kaufman, Ed., "Internet Key Exchange (IKEv2) Protocol", Network Working Group Request for Comments: 4306 Obsoletes: 2407,2408, 2409 Catergory: Standards Track, Microsoft, Dec. 2005.
(Continued)

*Primary Examiner* — Joseph P Hirl
*Assistant Examiner* — J. Brant Murphy
(74) *Attorney, Agent, or Firm* — Arent Fox LLP

(57) ABSTRACT

A communication apparatus performs encryption on data transmitted from another communication apparatus by using first or second cryptographic algorithm, or performs decryption on the data that has been encrypted using the first or second cryptographic algorithm, by using one of the first and second cryptographic algorithms used for the encryption, where the second cryptographic algorithm provides a higher security level than the first cryptographic algorithm. The communication apparatus includes an encryption unit configured to perform, upon receiving the data including a cryptographic class identifying a parameter to be used for performing the encryption or the decryption, the encryption or the decryption by using one of the first and second cryptographic algorithms, based on the cryptographic class.

21 Claims, 14 Drawing Sheets

(56) References Cited

U.S. PATENT DOCUMENTS

| | | | |
|---|---|---|---|
| 8,130,957 B2* | 3/2012 | Little et al. | 380/270 |
| 2002/0056044 A1* | 5/2002 | Andersson | 713/189 |
| 2003/0061505 A1* | 3/2003 | Sperry et al. | 713/200 |
| 2004/0083360 A1* | 4/2004 | Walsh et al. | 713/160 |
| 2004/0202319 A1* | 10/2004 | Hussain | H04L 63/0428 380/33 |
| 2005/0169253 A1* | 8/2005 | Hu | 370/352 |
| 2005/0198498 A1* | 9/2005 | Gaur | H04L 63/164 713/160 |
| 2005/0216750 A1* | 9/2005 | Bricher et al. | 713/189 |
| 2005/0244007 A1* | 11/2005 | Little et al. | 380/270 |
| 2008/0133953 A1* | 6/2008 | Kawaji | 713/322 |
| 2008/0170686 A1* | 7/2008 | Nemoto et al. | 380/42 |
| 2009/0132821 A1 | 5/2009 | Matsuzaki | |
| 2010/0161959 A1* | 6/2010 | Sood | |
| 2010/0199085 A1* | 8/2010 | Bansal | 713/153 |
| 2010/0268936 A1* | 10/2010 | Matsushima | G06F 21/62 713/153 |
| 2010/0306553 A1* | 12/2010 | Poletti, III | G06F 7/00 713/189 |
| 2010/0332820 A1* | 12/2010 | Matsushima et al. | 713/150 |
| 2011/0103771 A1* | 5/2011 | Choo et al. | 386/259 |
| 2012/0011351 A1* | 1/2012 | Mundra | G06F 21/72 713/1 |
| 2012/0200423 A1* | 8/2012 | DiLuciano et al. | 340/870.01 |
| 2012/0219149 A1* | 8/2012 | Lu et al. | 380/28 |

OTHER PUBLICATIONS

S. Kent et al, "Security Architecture for the Internet Protocol", Network Working Group Request for Comments: 4301 Obsoletes: 2401 Category: Standards Track, BBN Technologies, Dec. 2005.

S. Kent, "IP Encapsulating Security Payload (ESP)", Network Working Group Request for Comments: 4303 Obsoletes: 2406 Category: Standards Track, BBN Technologies, Dec. 2005.

Office Action of Japanese Patent Application No. 2012-250276 dated Jun. 7, 2016 with partial translation.

* cited by examiner

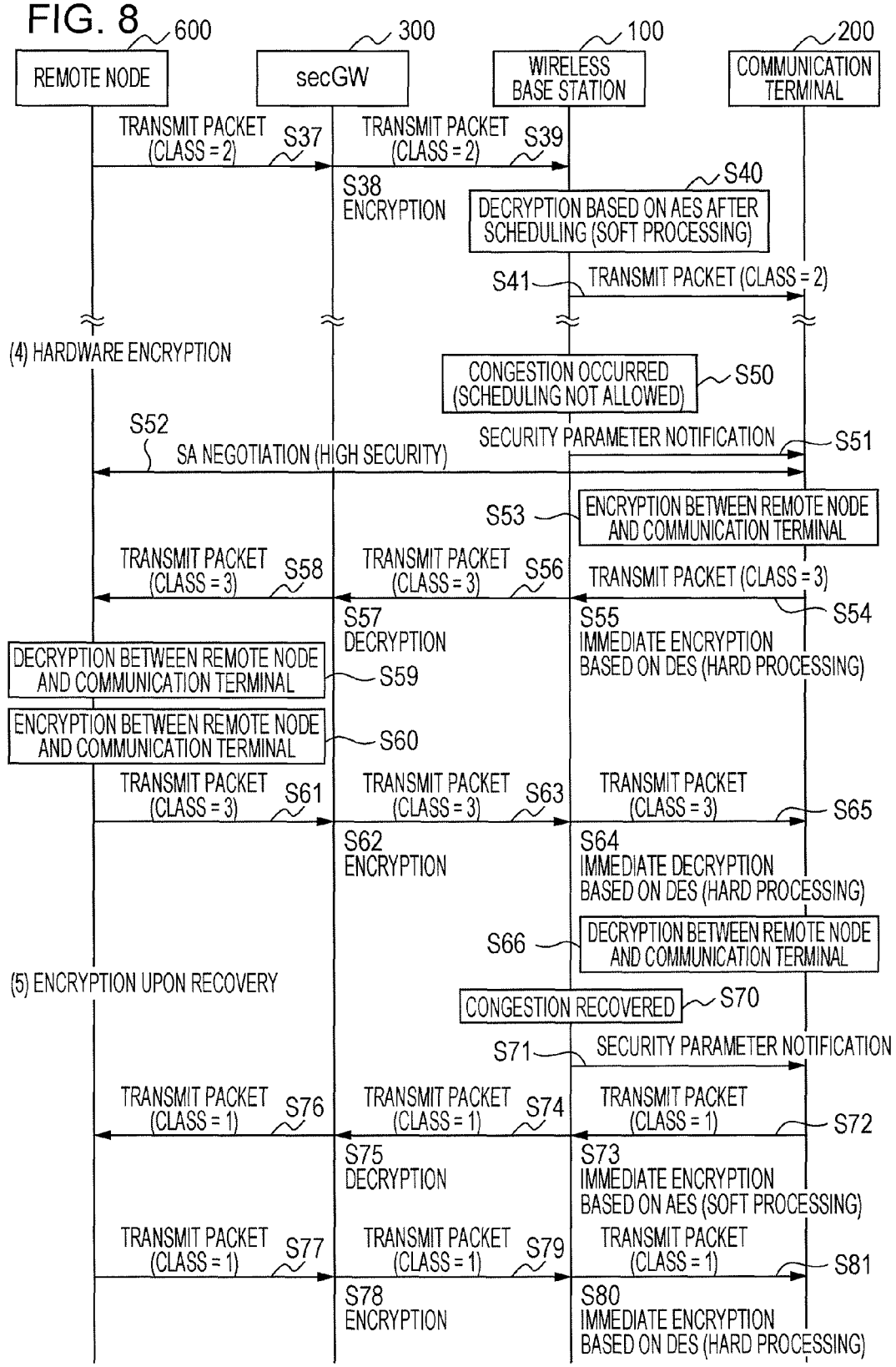

FIG. 9A

| SERVICE TYPE | CANDIDATE (PRIORITY DESCENDING ORDER) | ALGORITHM | MAXIMUM RATE | QUEUING | CRYPTOGRAPHIC CLASS | RESULT (INVALID UPON REQUEST) |
|---|---|---|---|---|---|---|
| CONFIDENTIAL PACKET | FIRST CHOICE | AES | 0.1 Mbps | NOT ALLOWED | 1 | |
| | SECOND CHOICE | AES | 0.1 Mbps | ALLOWED | 2 | |
| | THIRD CHOICE | DES | 0.1 Mbps | NOT ALLOWED | 3 | |
| NORMAL PACKET | FIRST CHOICE | AES(DES) | 100 Mbps | NOT ALLOWED | 4 | |
| VOICE | FIRST CHOICE | DES | 100 Mbps | NOT ALLOWED | 5 | |
| STREAM | FIRST CHOICE | DES | 100 Mbps | NOT ALLOWED | 6 | |

FIG. 9B

| SERVICE TYPE | CANDIDATE (PRIORITY DESCENDING ORDER) | ALGORITHM | MAXIMUM RATE | QUEUING | CRYPTOGRAPHIC CLASS | RESULT (INVALID UPON REQUEST) |
|---|---|---|---|---|---|---|
| CONFIDENTIAL PACKET | FIRST CHOICE | AES | 0.1 Mbps | NOT ALLOWED | 1 | OK |
| | SECOND CHOICE | AES | 0.1 Mbps | ALLOWED | 2 | – |
| | THIRD CHOICE | DES | 0.1 Mbps | NOT ALLOWED | 3 | – |
| NORMAL PACKET | FIRST CHOICE | AES(DES) | 100 Mbps | NOT ALLOWED | 4 | OK |
| VOICE | FIRST CHOICE | DES | 100 Mbps | NOT ALLOWED | 5 | OK |
| STREAM | FIRST CHOICE | DES | 100 Mbps | NOT ALLOWED | 6 | OK |

FIG. 10A

| SERVICE TYPE | CANDIDATE (PRIORITY DESCENDING ORDER) | ALGORITHM | MAXIMUM RATE | QUEUING | CRYPTOGRAPHIC CLASS | RESULT (INVALID UPON REQUEST) |
|---|---|---|---|---|---|---|
| CONFIDENTIAL PACKET | FIRST CHOICE | AES | 0.1 Mbps | NOT ALLOWED | 1 | NG |
| | SECOND CHOICE | AES | 0.1 Mbps | ALLOWED | 2 | OK |
| | THIRD CHOICE | DES | 0.1 Mbps | NOT ALLOWED | 3 | — |
| NORMAL PACKET | FIRST CHOICE | AES(DES) | 100 Mbps | NOT ALLOWED | 4 | OK |
| VOICE | FIRST CHOICE | DES | 100 Mbps | NOT ALLOWED | 5 | OK |
| STREAM | FIRST CHOICE | DES | 100 Mbps | NOT ALLOWED | 6 | OK |

FIG. 10B

| SERVICE TYPE | CANDIDATE (PRIORITY DESCENDING ORDER) | ALGORITHM | MAXIMUM RATE | QUEUING | CRYPTOGRAPHIC CLASS | RESULT (INVALID UPON REQUEST) |
|---|---|---|---|---|---|---|
| CONFIDENTIAL PACKET | FIRST CHOICE | AES | 0.1 Mbps | NOT ALLOWED | 1 | NG |
| | SECOND CHOICE | AES | 0.1 Mbps | ALLOWED | 2 | NG |
| | THIRD CHOICE | DES | 0.1 Mbps | NOT ALLOWED | 3 | OK |
| NORMAL PACKET | FIRST CHOICE | AES(DES) | 100 Mbps | NOT ALLOWED | 4 | OK |
| VOICE | FIRST CHOICE | DES | 100 Mbps | NOT ALLOWED | 5 | OK |
| STREAM | FIRST CHOICE | DES | 100 Mbps | NOT ALLOWED | 6 | OK |

APPARATUS AND METHOD FOR PERFORMING DIFFERENT CRYPTOGRAPHIC ALGORITHMS IN A COMMUNICATION SYSTEM

CROSS-REFERENCE TO RELATED APPLICATION

This application is based upon and claims the benefit of priority of the prior Japanese Patent Application No. 2012-250276, filed on Nov. 14, 2012, the entire contents of which are incorporated herein by reference.

FIELD

The embodiments discussed herein are related to apparatus and method for performing different cryptographic algorithms in a communication system.

BACKGROUND

A mobile communication system, such as a mobile phone system or a wireless local area network (LAN), is widely utilized at the moment. For example, 3rd Generation Partnership Project (3GPP) serving as a standard-setting organization completes or reviews a standardization of a communication specification, such as Long Term Evolution (LTE) or LTE-Advanced (LTE-A).

Along with the spread of smart phones and the like in the mobile communication system of these days, not only voice communications but also various services, such as video streaming, browser, global positioning system (GPS) location information, and credit settlement, are provided. In the mobile communication system, more important information including privacy information, such as the GPS location information and credit information, than other information may also be communicated. On the other hand, the communication traffic amount in the mobile communication system is significantly increased as compared with a previous era, with the use of streaming, browser, and the like.

In the above-mentioned mobile communication system, a protocol called Security Architecture for the Internet Protocol (IPsec) may be used in some cases. The IPsec is a protocol that provides a data alteration proof and a confidential function by using a cryptographic technology for each IP packet, for example.

The IPsec is utilized, for example, by combining plural protocols including an authentication mechanism and data security guarantee based on an authentication header (AH), a security protocol such as a data encryption based on Encapsulated Security Payload (ESP), a key exchange protocol such as Internet Key Exchange Protocol (IKE), and the like, with each other.

For example, with the utilization of the IPsec in the mobile communication system, spying and alteration of the privacy information, the credit information, and the like in the middle of a communication path may be avoided, and the security of the communication path may be secured.

The above-mentioned encryption processing based on the IPsec may be conducted by hardware such as dedicated-use large scale integration (LSI) in some cases. Since the encryption processing is conducted by the hardware, it is possible to increase the speed of the processing, for example, as compared with the processing conducted by software such as a central processing unit (CPU).

Meanwhile, the following technology related to the encryption processing is proposed, for example. That is, a data communication apparatus in which a cryptographic algorithm, such as high speed hardware processing or low speed software processing, is selected on the basis of a battery remaining amount, a communication expectation time notified by communication application, a cryptographic strength, and the like, is proposed. According to this technology, for example, a communication security and a communication duration of a portable device may be secured.

See RFC 4301 "Security Architecture for the Internet Protocol", RFC 4303 "IP Encapsulating Security Payload (ESP)", and RFC 4306 "Internet Key Exchange (IKEv2) Protocol".

See also Japanese Laid-open Patent Publication No. 2005-117232.

SUMMARY

According to an aspect of the invention, a communication apparatus performs encryption on data transmitted from another communication apparatus by using first or second cryptographic algorithm, or performs decryption on the data that has been encrypted using the first or second cryptographic algorithm, by using one of the first and second cryptographic algorithms used for the encryption, where the second cryptographic algorithm provides a higher security level than the first cryptographic algorithm. The communication apparatus includes an encryption unit configured to perform, upon receiving the data including a cryptographic class identifying a parameter to be used for performing the encryption or the decryption, the encryption or the decryption by using one of the first and second cryptographic algorithms, based on the cryptographic class.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 and FIG. 8 are diagrams illustrating an example of an operational sequence for a communication system, according to an embodiment;

FIG. 9A illustrates an example of a security parameter request, according to an embodiment;

FIG. 9B illustrates an example of a security parameter notification, according to an embodiment;

FIG. 10A and FIG. 10B are diagrams each illustrating an example of a security parameter notification, according to an embodiment;

DESCRIPTION OF EMBODIMENTS

As mentioned above, in a case where the processing is conducted by the hardware with regard to cryptographic processing, an apparatus to which the above-mentioned hardware is mounted may be unable to use a new cryptographic program in some cases. For example, it may be difficult to change a cryptographic program loaded to a dedicated-use LSI once the cryptographic program has been loaded to the hardware.

For that reason, in order to use a new cryptographic program in the apparatus to which the hardware is mounted, the hardware itself may be replaced. In this case, the cost is increased because of the replacement of the hardware.

In these days, a decryption skill for the cryptographic algorithm is evolved, and to cope with this situation, a new encryption is used in some cases. This is because, the use of the new encryption allows the security to be secured against a new threat in the communication path, for example.

Therefore, in a case where the apparatus does not use the new cryptographic program after the apparatus to which the hardware is mounted is installed, for example, a higher security in communication path than the security at the time of the installment of the apparatus is not achieved in the mobile communication system.

Further, in the case of the technology of selecting the cryptographic algorithm on the basis of the battery remaining amount or the like, a cryptographic communication is conducted by taking the battery remaining amount into account, but the use of the new cryptographic algorithm is not taken into account. Therefore, this technology also fails to cope with the new security threat after the installment of the apparatus, and higher security in communication path than the security at the time of the installment of the apparatus is not achieved.

Hereinafter, embodiments for carrying out embodiments will be described.

First Embodiment

Figure 1:
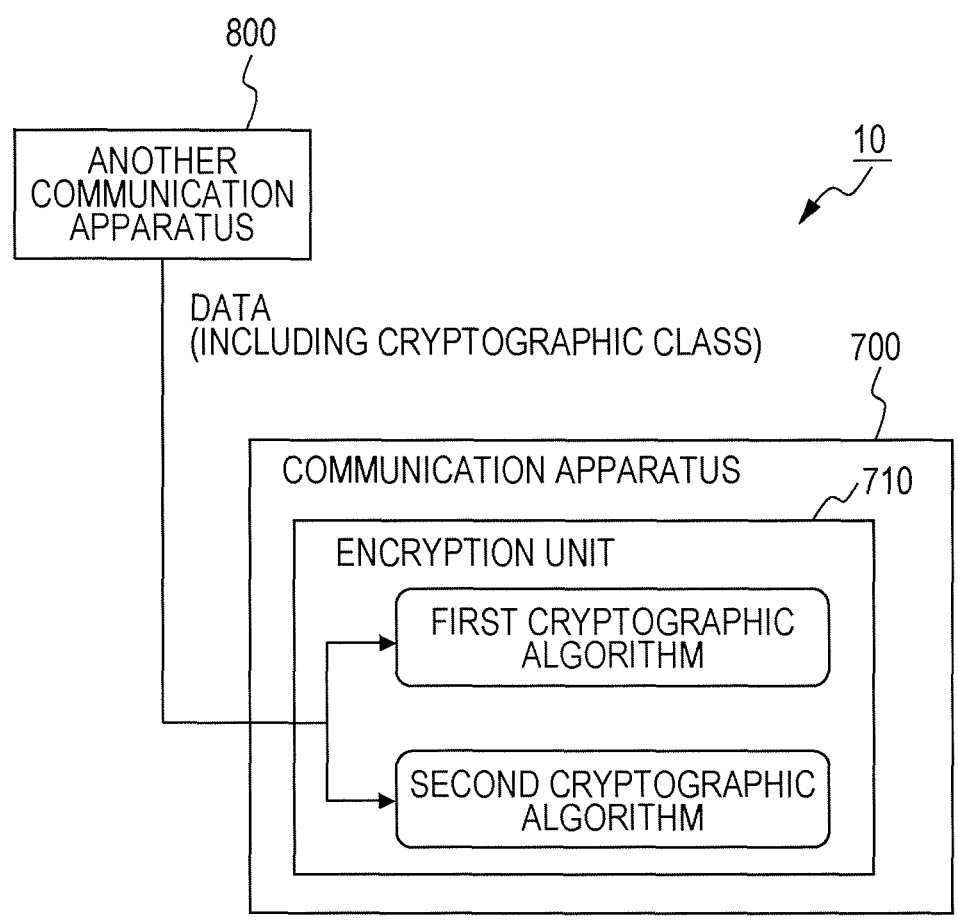
FIG. 1 illustrates a configuration example of a communication system, according to an embodiment.

First, a description will be given of a first embodiment. FIG. 1 illustrates a configuration example of a communication system, according to a first embodiment. The communication system 10 includes a communication apparatus 700 and another communication apparatus 800.

The communication apparatus 700 performs encryption, by using a first cryptographic algorithm or a second cryptographic algorithm, on the data transmitted from the other communication apparatus 800. The communication apparatus 700 also performs decryption on the data that has been encrypted using the first cryptographic algorithm or the second cryptographic algorithm, by using the cryptographic algorithm used for the encryption.

The communication apparatus 700 includes an encryption unit 710. When data including a cryptographic class for identifying a parameter used for encryption or decryption is received, the encryption unit 710 performs the encryption or decryption for the data, by using the first or second cryptographic algorithm, based on the cryptographic class. In this case, the second cryptographic algorithm is an algorithm having a higher security level than the first cryptographic algorithm.

For example, the first cryptographic algorithm is set as a cryptographic algorithm that is executable when the communication apparatus 700 is installed, and the second cryptographic algorithm is set as a cryptographic algorithm that is executable by downloading or the like after the installment of the communication apparatus 700.

In this case, the communication apparatus 700 executes the encryption or the decryption based on the second cryptographic algorithm (hereinafter, which may be referred to as "encryption or the like"), so as to realize the higher security than the first cryptographic algorithm that is executable at the time of the installment.

Furthermore, in this case, when the communication apparatus 700 downloads a most updated cryptographic algorithm to be executed, it is possible to regularly cope with a new security threat by the updated cryptographic algorithm. In the communication apparatus 700, for example, the above-mentioned updated cryptographic algorithm is executable as the second cryptographic algorithm.

The encryption unit 710 is configured to select the first or second cryptographic algorithm, based on the cryptographic class. For this reason, for example, when the cryptographic classes are different from each other in accordance with a type of a service provided to the another communication apparatus 800 by the communication apparatus 700, the encryption unit 710 is able to select the first or second cryptographic algorithm in accordance with the service type. Therefore, the communication apparatus 700 is able to secure the security in accordance the service.

For example, the communication apparatus 700 may also apply the second cryptographic algorithm to data related to "confidential packets" with regard to a bank or a card settlement and apply the first cryptographic algorithm to "normal packets" with regard to an electronic mail or the like and "voice".

Second Embodiment

Next, a description will be given of a second embodiment. The second embodiment will be described in the following order. That is, first, a configuration of a communication system will be described, and then, configuration examples of respective apparatuses included in the communication system will be described. An operation example will lastly be described.

Entire Configuration Example

Figure 2:
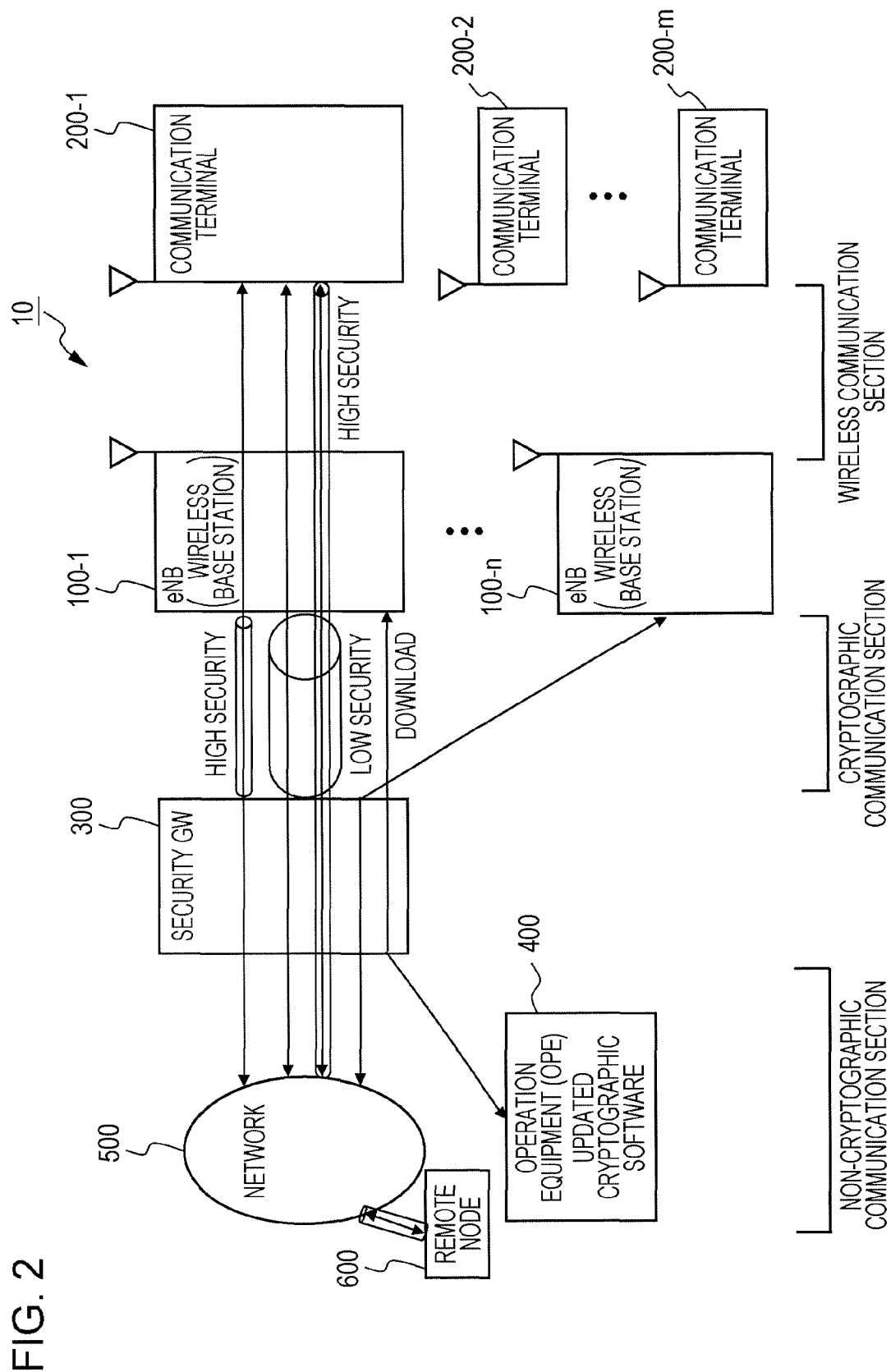
FIG. 2 illustrates a configuration example of a communication system, according to an embodiment.

FIG. 2 is a diagram illustrating a configuration example of a communication system, according to a second embodiment. The communication system 10 includes wireless base stations (evolved Node B: eNB) (hereinafter, which will be referred to as "base station") 100-1 to 100-$n$, communication terminal apparatuses (hereinafter, which will be referred to as "communication terminal") 200-1 to 200-$m$, a security gateway (GW) 300, an operation equipment (hereinafter, which will be referred to as "OPE") 400, a network 500, and a remote node 600.

The base stations 100-1 to 100-$n$ correspond, for example, to the communication apparatus 700 according to the first embodiment. The communication terminals 200-1 to 200-$m$ correspond, for example, to the another communication apparatus 800 according to the first embodiment.

The respective base stations 100-1 to 100-*n* are communication apparatuses that are wirelessly connected to the communication terminals 200-1 to 200-*m* to perform a wireless communication. The respective base stations 100-1 to 100-*n* are configured to provide the communication terminals 200-1 to 200-*m* within one or more cell ranges of their own stations, with various services, such as voice communication, video streaming, provision of GPS information, and credit settlement.

The respective base stations 100-1 to 100-*n* further execute a cryptographic program to perform cryptographic processing on the packet data transmitted and received between the base stations 100-1 to 100-*n* and the security GW 300 to secure the security of the communication path therebetween. A reason why the security of the communication paths between the respective base stations 100-1 to 100-*n* and the security GW 300 is to be secured will be described below.

According to the second embodiment, a situation in which the cryptographic processing or the decryption processing is conducted by a hard engine such as a dedicated-use LSI (for example, an application specific integrated circuit) will be referred, for example, as encryption based on the hardware. In addition, a situation in which the cryptographic processing or the decryption processing is conducted by a CPU or the like will be referred, for example, as encryption based on the software.

The respective base stations 100-1 to 100-*n* perform the encryption based on the hardware by using the hard engine amounted in the apparatus and perform the encryption based on the software by using the CPU. Details of processing performed by the respective base stations 100-1 to 100-*n* will be described below.

The respective communication terminals 200-1 to 200-*m* are, for example, a feature phone, a smart phone, a personal computer configured to perform wireless communication, and the like. The respective communication terminals 200-1 to 200-*m* are also, for example, communication apparatuses that are wirelessly connected to the respective base stations 100-1 to 100-*n* to perform the wireless communication. Details of the communication terminals 200-1 to 200-*m* will also be described below.

In the example of FIG. 2, a situation in which the communication terminal 200-1 is wirelessly connected to the base station 100-1 to perform the wireless communication is illustrated. As another situation for the wireless communication, for example, the other communication terminals 200-2 to 200-*m* may perform the wireless communication with the base station 100-1, or the communication terminal 200-1 may perform the wireless communication with the respective base stations 100-2 to 100-*n*.

The security GW 300 is a communication apparatus that is connected to one or more of the base stations 100-1 to 100-*n* and also connected to the remote node 600 via the network 500. The cryptographic program may be executed also in the security GW 300, so as to secure the security of the communication paths between the security GW 300 and the respective base stations 100-1 to 100-*n*. The encryption based on the hardware may be conducted also in the security GW 300 similarly as in the respective base stations 100-1 to 100-*n*, and the encryption based on the software may also be conducted. Details of the security GW 300 will be described below.

According to the second embodiment, the cryptographic program is mainly executed in the security GW 300 and the respective base stations 100-1 to 100-*n*. This allows, for example, the security of the communication paths between the security GW 300 and the respective base stations 100-1 to 100-*n* to be secured. The above-mentioned communication path may be, for example, a commercial network such as the internet. The installment locations of the respective base stations 100-1 to 100-*n* and the installment locations of the security GW 300 and the like are, for example, different from each other. In the case where apparatuses are installed at the same location, the security of the communication path between the apparatuses is secured, for example, by executing the cryptographic program among the apparatuses installed at the same location. However, the number of occasions when the cryptographic program is mutually executed among the apparatuses installed at different locations is lower than that of the apparatuses installed at the same location, and the second embodiment may be applied to these apparatuses. For that reason, according to the second embodiment, the security is secured also for the communication paths between the respective base stations 100-1 to 100-*n* and the security GW 300.

In the example of FIG. 2, two cryptographic tunnels providing a "high security" and a "low security" are established between the base station 100-1 and the security GW 300. According to the second embodiment, the packet data or the like to which the encryption based, for example, on an Advanced Encryption Standard (AES) system is applied is exchanged through the cryptographic tunnel providing the "high security". The packet data or the like to which the encryption based, for example, on a Data Encryption Standard (DES) system is applied is exchanged through the cryptographic tunnel providing the "low security".

The AES system is, for example, a common key encryption system standardized as Advanced Encryption Standard (AES) of the USA. The AES encryption system is an encryption system that is adopted through open recruitment by National Institute of Standard and Technology (NIST) of the USA in 1997 due to decrease in safety with regard to the DES encryption system as the previous standard. The DES system is, for example, a former national encryption standard of the USA or a common key encryption system standardized by the standard.

The OPE 400 is, for example, an apparatus configured to maintain and manage the respective apparatuses 100-1 to 100-*n*, 300, and the like connected in a wired manner in the communication system 10. According to the second embodiment, the OPE 400 holds the updated cryptographic program (or cryptographic software) and is configured to transmit the updated cryptographic program to the security GW 300 and the respective base stations 100-1 to 100-*n*. The updated cryptographic program is, for example, a cryptographic program based on the AES system.

The remote node 600 is a communication apparatus for a communication opposite party of the communication terminal 200-1. The remote node 600 is connected to the security GW 300 via the network 500.

According to the example of FIG. 2, the cryptographic tunnel providing the "high security" is also established between the communication terminal 200-1 and the remote node 600. For example, the packet data or the like to which the encryption based on the AES system is applied can be exchanged in the communication terminal 200-1 or the remote node 600 through the cryptographic tunnel providing the "high security".

This cryptographic tunnel providing the "high security" is configured to pass through the cryptographic tunnel providing the "low security" between the base station 100-1 and the security GW 300. This indicates, for example, that the encryption with the "low security" is applied in the base station 100-1 to the packet data including the data on which the encryption with the "high security" is conducted in the communication terminal 200-1, and the packet data obtained by packetizing this is transmitted to the security GW 300. This allows the two tunnels to be realized in the same communication path. Details thereof will be described below.

According to the second embodiment, the encryption systems with the "high security" and the "low security" are respectively realized by the two encryption systems including the AES system (hereinafter, which will be referred to as "AES") and the DES system (hereinafter, which will be referred to as "DES"). For example, if an encryption system having a security degree higher than the AES exists, the AES may be set as the "low security", and the encryption system having the security degree higher than the AES may be set as the "high security".

Configuration Example of the Base Station 100

Next, a configuration example of the base stations 100-1 to 100-n will be described. Unless otherwise stated, the base stations 100-1 to 100-n will hereinafter be collectively described as the base station 100. In addition, unless otherwise stated, the communication terminals 200-1 to 200-m will hereinafter be collectively described as the communication terminal 200.

Figure 3:
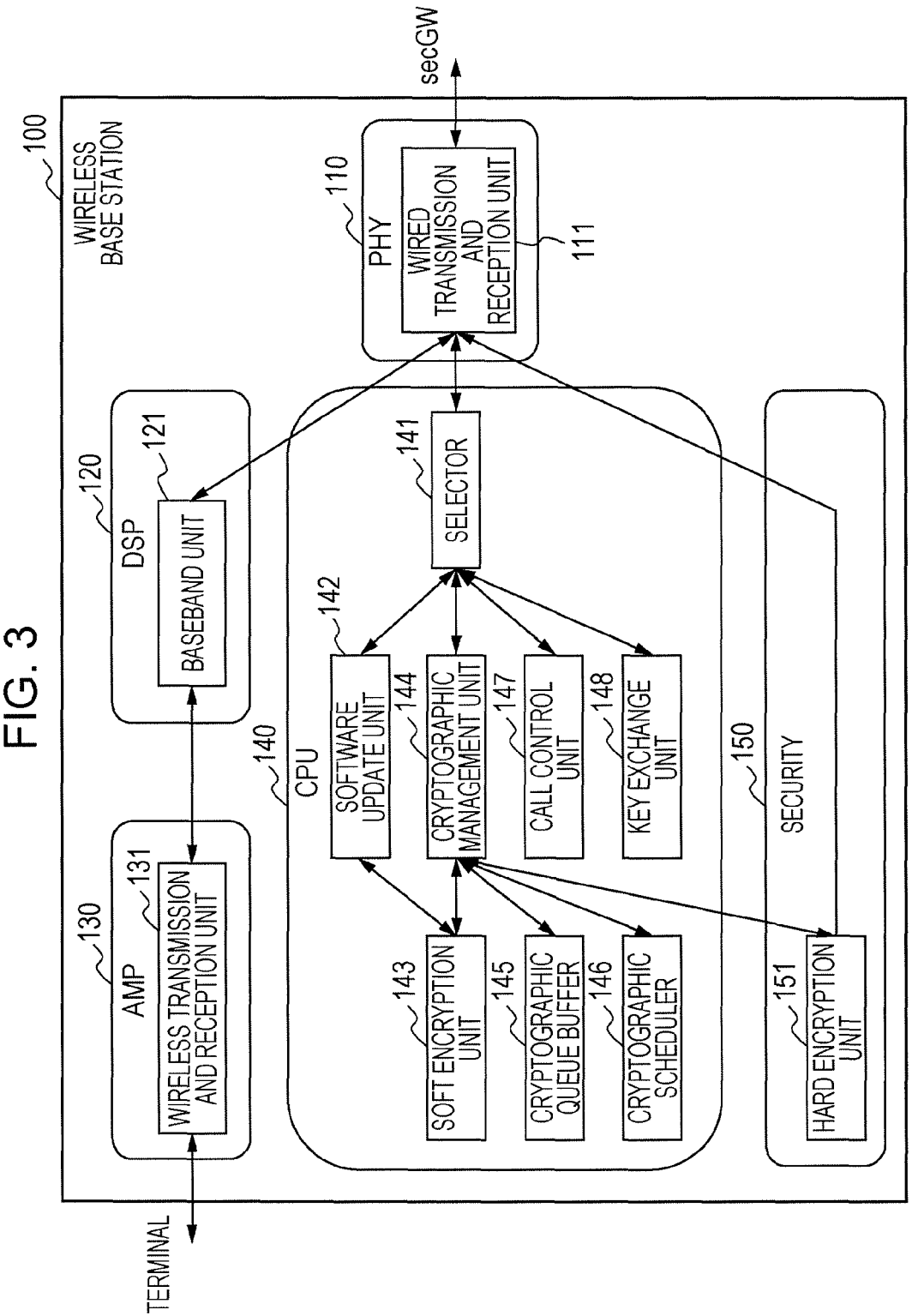
FIG. 3 illustrates a configuration example of a base station, according to an embodiment.

FIG. 3 is a diagram illustrating a configuration example of a base station, according to a second embodiment. The base station 100 includes an Ethernet (registered trademark) physical layer (PHY) 110, a digital signal processor (DSP) 120, an amplifier (AMP) 130, a CPU 140, and a SECURITY 150.

The CPU 140 and the SECURITY 150 correspond, for example, to the encryption unit 710 according to the first embodiment.

The PHY 110 includes a wired transmission and reception unit 111. The wired transmission and reception unit 111 is connected, for example, to the security GW 300 and performs transmission and reception of packet data or the like with the security GW 300. The wired transmission and reception unit 111 is also connected to the DSP 120 and performs transmission and reception of packet data with the communication terminal 200.

The wired transmission and reception unit 111 is further connected to the CPU 140. The wired transmission and reception unit 111 is configured to encrypt the packet data and decrypt the encrypted packet data by outputting the packet data or the like transmitted from the security GW 300 or the communication terminal 200 to the CPU 140. The wired transmission and reception unit 111 receives the encrypted packet data, the decrypted packet data, or the like from the CPU 140 or the SECURITY 150, and transmits them to the security GW 300 or the communication terminal 200.

The DSP 120 includes a baseband unit 121. The baseband unit 121 converts packet data or the like output from the wired transmission and reception unit 111 into a baseband signal by performing, for example, error correction coding processing, modulation processing, or the like on the packet data. The baseband unit 121 outputs the converted baseband signal to a wireless transmission and reception unit 131. The baseband unit 121 also extracts data or the like by performing, for example, demodulation processing, error correction decoding processing, or the like on the baseband signal output from the wireless transmission and reception unit 131. The baseband unit 121 outputs the extracted data or the like to the PHY 110.

The AMP 130 includes the wireless transmission and reception unit 131. The wireless transmission and reception unit 131 performs a frequency conversion (up-convert) on the baseband signal output from the DSP 120 into a wireless signal in a wireless bandwidth. The wireless transmission and reception unit 131 transmits the wireless signal to the communication terminal 200. The wireless transmission and reception unit 131 also receives the wireless signal transmitted from the communication terminal 200 and performs a frequency conversion (down-convert) or the like on the received wireless signal into the baseband signal in the baseband bandwidth. The wireless transmission and reception unit 131 outputs the converted baseband signal to the DSP 120.

The CPU 140 includes a selector 141, a software update unit 142, a soft encryption unit 143, a cryptographic management unit 144, a cryptographic queue buffer 145, a cryptographic scheduler 146, a call control unit 147, and a key exchange unit 148.

These processing blocks in the CPU 140 are also, for example, function blocks that may be realized by the CPU 140 reading out and executing a program stored in a read only memory (ROM, which is not illustrated in the drawing) or the like. In this case, the cryptographic queue buffer 145 may also be set, for example, as a memory such as a random access memory (RAM) located outside the CPU 140 or a buffer in the CPU 140.

The selector 141 outputs the data or the like output from the wired transmission and reception unit 111 to the software update unit 142, the cryptographic management unit 144, the call control unit 147, or the key exchange unit 148, based on the cryptographic class, the security protocol, or the like. Details of the cryptographic class, sorting of the data or the like, etc. will be descried below. The selector 141 also receives the data or the like output from the cryptographic management unit 144, the call control unit 147, or the key exchange unit 148, and outputs this data to the wired transmission and reception unit 111.

The software update unit 142 updates the cryptographic program (or cryptographic software) so that the updated cryptographic program received from the OPE 400 is executed in the base station 100. The software update unit 142 includes, for example, a memory therein and updates the software by storing the received updated cryptographic program in the memory.

The soft encryption unit 143 reads out the cryptographic program from the software update unit 142 and executes the cryptographic program to perform encryption and decryption processing (hereinafter, which will simply be referred to as "cryptographic processing") on the packet data or the like received from the cryptographic management unit 144. The soft encryption unit 143 performs, for example, the cryptographic processing, based on the AES, on the packet data or the like.

The cryptographic management unit 144 performs generation and termination of a security parameter request and a security parameter notification transmitted between the base station 100 and the communication terminal 200. Details and the like of the security parameter request and the security parameter notification will be described below. The cryptographic management unit 144 also outputs the packet data received from the selector 141 to the soft encryption unit 143, the cryptographic queue buffer 145, or a hard encryption unit 151, based on the cryptographic class or the like. When the data or the like on which the cryptographic processing is conducted is received from the soft encryption unit 143 or the hard encryption unit 151, the cryptographic management unit 144 outputs this data to the selector 141. Details of the processing conducted in the cryptographic management unit 144 will be described below.

The cryptographic queue buffer 145 is a memory that stores the packet data or the like before the encryption or before the decryption so that the cryptographic processing is to be conducted after an elapse of a scheduled period of time when a usage rate of the processing is higher than a threshold with regard to the cryptographic processing conducted in the soft encryption unit 143. Details of the processing will also be described below.

The cryptographic scheduler 146 calculates (schedules) a timing at which the usage rate of the cryptographic processing conducted in the soft encryption unit 143 is lower than or equal to a threshold value and outputs the calculated timing to the cryptographic management unit 144. In the cryptographic management unit 144, the packet data or the like stored in the cryptographic queue buffer 145 is read out at this timing and output to the soft encryption unit 143 where the cryptographic processing is conducted. Details of the above-mentioned processing will be described below.

A case in which the cryptographic management unit 144 does not store the data output from the selector 141 in the cryptographic queue buffer 145 but outputs the data to the soft encryption unit 143 to carry out the encryption based on the software will be also referred to as "immediate software encryption", for example. In addition, a case in which the cryptographic management unit 144 stores the packet data output from the selector 141 in the cryptographic queue buffer 145 and thereafter outputs the packet data to the soft encryption unit 143 to carry out the cryptographic processing will be also referred to as "software encryption by scheduling", for example.

The call control unit 147 performs, for example, processing related to a call connection between the base station 100 and the communication terminal 200 or between the base station 100 and the security GW 300. The call control unit 147 performs, for example, the generation or termination of various messages for the call connection to control the call connection.

The key exchange unit 148 exchanges a message, based on the key exchange protocol (for example, Internet Key Exchange (IKE)), for example, with the security GW 300. The key exchange is conducted, for example, before the cryptographic tunnel is established. The key exchange unit 148 generates a new key by using the exchanged key, for example, to establish the cryptographic tunnels with the "high security" and the "low security" in the communication path to the security GW 300.

The SECURITY 150 includes the hard encryption unit 151. The hard encryption unit 151 performs the cryptographic processing by the hardware on the data output from the cryptographic management unit 144. For example, the SECURITY 150 is a dedicated-use LSI configured to perform the cryptographic processing, and the hard encryption unit 151 is a part where the cryptographic processing is carried out in the LSI. For example, the security level is lower but the speed of the cryptographic processing is higher in the cryptographic processing by the hardware conducted in the hard encryption unit 151 as compared with the cryptographic processing conducted in the soft encryption unit 143.

In the second embodiment, the cryptographic processing conducted in the hard encryption unit 151 will be also referred, for example, as the "hardware encryption".

Configuration Example of the Communication Terminal 200

Figure 4:
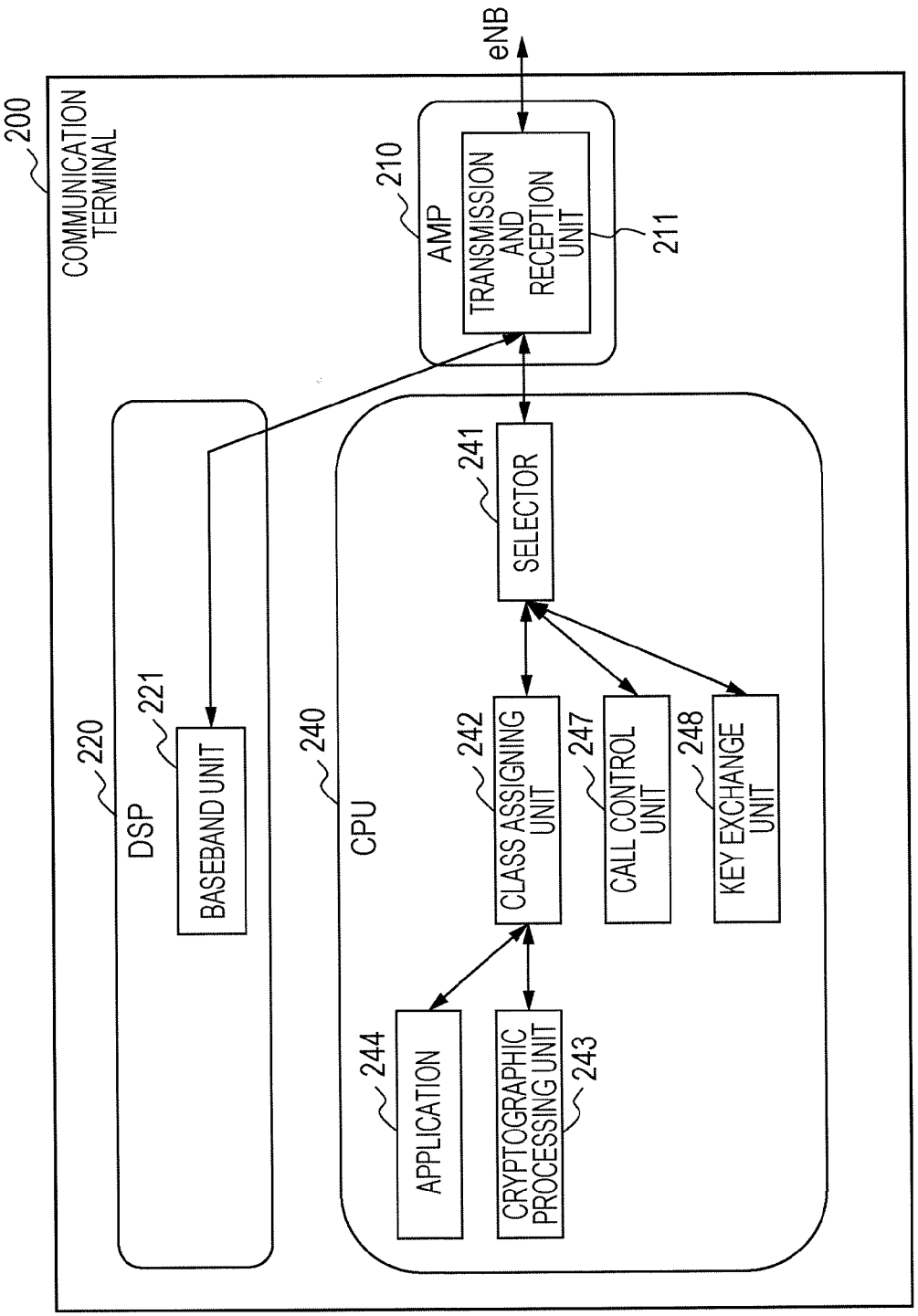
FIG. 4 illustrates a configuration example of a communication terminal, according to an embodiment.

Next, a configuration example of the communication terminal 200 will be described. FIG. 4 is a diagram illustrating a configuration example of a communication terminal, according to an embodiment. The communication terminal 200 includes an AMP 210, a DSP 220, and the CPU 240.

The AMP 210 includes a transmission and reception unit 211. The transmission and reception unit 211 receives the wireless signal transmitted from the base station 100 and transmits the wireless signal to the base station 100.

For example, the transmission and reception unit 211 receives the wireless signal transmitted from the base station 100, and converts (down-convert) the received wireless signal into a baseband signal in the baseband bandwidth. The transmission and reception unit 211 outputs the converted baseband signal to a baseband unit 221. In this case, the transmission and reception unit 211 receives the data or the like on which the demodulation processing is conducted from the baseband unit 221 and outputs this data to the CPU 240. According to this, for example, it is possible to conduct the processing on the data or the like received from the base station 100 in the application 244 of the CPU 240.

When the data or the like is received from the CPU 240, the transmission and reception unit 211 outputs this data to the baseband unit 221. In this case, the transmission and reception unit 211 receives the data on which the modulation processing, or the like is conducted from the baseband unit 221 and converts (up-convert) this into the wireless signal in the wireless bandwidth. The transmission and reception unit 211 transmits the wireless signal to the base station 100. According to this, for example, the communication terminal 200 is able to transmit the data or the like to the base station 100.

The DSP 220 includes the baseband unit 221. The baseband unit 221 conducts the demodulation processing, the error correction decoding processing, or the like on the baseband signal received from the AMP 210 to extract the data or the like. The baseband unit 221 outputs the extracted data to the transmission and reception unit 211. When data or the like is received from the transmission and reception unit 211, the baseband unit 221 converts the data into the baseband signal by conducting the error correction coding processing or the modulation processing on the data. The baseband unit 221 outputs the converted baseband signal to the transmission and reception unit 211.

The CPU 240 includes a selector 241, a class assigning unit 242, a cryptographic processing unit 243, an application 244, a call control unit 247, and a key exchange unit 248. These processing blocks in the CPU 240 are also function blocks that are realized by the CPU 240 executing the program stored in the memory such as the ROM (not illustrated) in a manner similar to the CPU 140 in the base station 100.

The selector 241 receives the data or the like output from the transmission and reception unit 211 and outputs the data or the like to the class assigning unit 242, the call control unit 247, or the key exchange unit 248, based on the cryptographic class or the protocol. Details of the cryptographic class, the data sorting, and the like will be described below. The selector 241 also receives the data or the like output from the class assigning unit 242, the call control unit 247, or the key exchange unit 248, and outputs the received data or the like to the transmission and reception unit 211.

The class assigning unit 242 assigns the cryptographic class to the data or the like received from the application 244 and generates the security parameter request including the cryptographic class. Details of the assignment of the cryptographic class, the generation of the security parameter request, and the like will also be described below. FIG. 9A is a diagram illustrating an example of a security parameter request, according to an embodiment. "Service type", "cryptographic algorithm", "candidate", "maximum rate", "queuing", "cryptographic class", and "result" will be also referred, for example, as security parameters. The cryptographic class is, for example, an identifier for identifying a combination of these security parameters.

With reference to FIG. 4 again, the class assigning unit 242 transmits the generated security parameter request to the base station 100 via the selector 241 or the like. The class assigning unit 242 also receives a security parameter notification from the base station 100 via the selector 241 or the like as a reply to the transmitted security parameter request. After that, the class assigning unit 242 assigns the cryptographic class notified from the security parameter notification to the data received from the application 244, for example. The class assigning unit 242 then generates, for example, packet data including the data to which the cryptographic class is assigned and transmits the packet data to the base station 100 via the selector 241 or the like.

The cryptographic processing unit 243 performs the cryptographic processing on the data received from the class assigning unit 242. In the second embodiment, the cryptographic processing unit 243 performs, for example, the "high security" cryptographic processing based on the AES.

The application 244 performs processing related to an application layer. For example, the application 244 includes functions of a microphone, a camera, or the like and is configured to convert voice input via the microphone into voice data or convert video picked up by the camera into video data. The application 244 outputs the audio data, the video data, or the like to the class assigning unit 242. Alternatively, the application 244 is configured to receive the data from the class assigning unit 242 and to output the voice from a speaker or to display the video, characters, or the like on a screen.

The application 244 also generates, for example, a security parameter. For example, a user operates to input "high security" or the like in a port xxx of a TCP packet on a display screen of the communication terminal 200, and the application 244 generates the security parameter in accordance with this. The application 244 outputs the security parameter to the class assigning unit 242 which generates the security parameter notification, based on this parameter.

The call control unit 247 performs, for example, the processing related to the call connection between the remote node 600 and the communication terminal 200 or between the base station 100 and the communication terminal 200. The call control unit 247 controls the call connection by performing, for example, the generation or termination of the various messages related to the call connection.

The key exchange unit 248 exchanges a message or the like based on the key exchange protocol (for example, Internet Key Exchange (IKE)), for example, with the remote node 600, and performs the key exchange (SA negotiation). The key exchange is conducted, for example, before the cryptographic tunnel is established. The key exchange unit 248 generates a new key by using the exchanged key, for example, to establish the cryptographic tunnel providing the "high security" with the remote node 600.

Configuration Example of the Security GW 300

Figure 5:
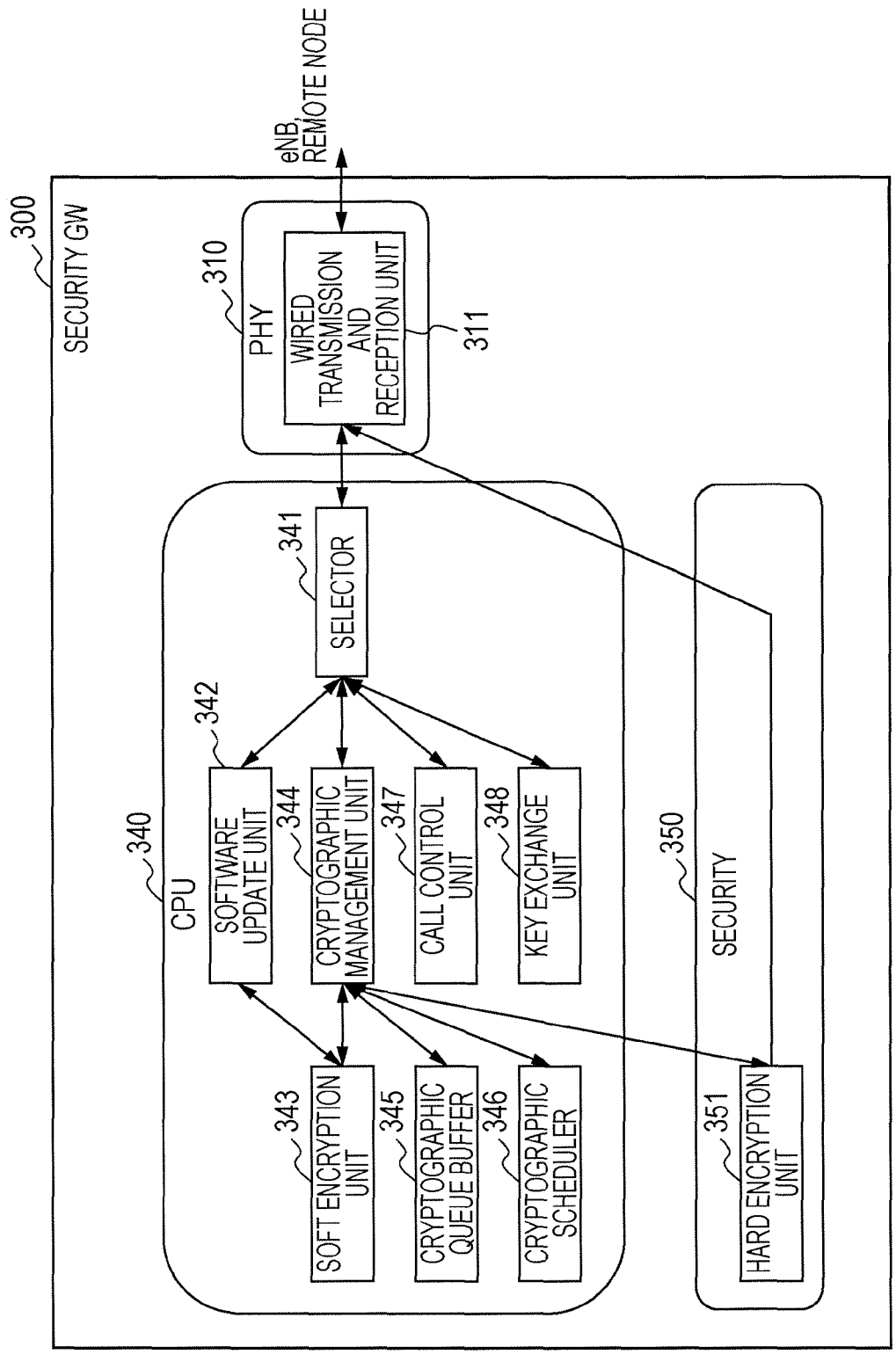
FIG. 5 illustrates a configuration example of a security gateway, according to an embodiment.

Next, a configuration example of the security GW 300 will be described. FIG. 5 is a diagram illustrating a configuration example of a security gateway (GW), according to an embodiment.

The security GW 300 includes a PHY 310, a CPU 340, and a SECURITY 350.

The PHY 310 includes a wired transmission and reception unit 311. The wired transmission and reception unit 311 is coupled to the base station 100, the OPE 400, and the remote node 600. The wired transmission and reception unit 311 transmits and receives the packet data or the like between the base station 100 and the remote node 600. The wired transmission and reception unit 311 also receives the updated cryptographic program from the OPE 400. The updated cryptographic program in this case is the same as the updated cryptographic program received by the base station 100, for example.

The wired transmission and reception unit 311 is connected to the CPU 340 and the SECURITY 350. The wired transmission and reception unit 311 is configured to perform cryptographic processing by outputting the received packet data or the like to the CPU 340, and also to receive the data on which the decryption processing has been conducted from the SECURITY 350.

The CPU 340 includes a selector 341, a software update unit 342, a soft encryption unit 343, a cryptographic management unit 344, a cryptographic queue buffer 345, a cryptographic scheduler 346, a call control unit 347, and a key exchange unit 348. These processing blocks in the CPU 340 are also, for example, function blocks that are realized by executing the program in the CPU 340. In this case, the cryptographic queue buffer 345 corresponds to a memory or a buffer provided to an internal part or an external part of the CPU 340.

The selector 341 outputs the packet data or the like output from the wired transmission and reception unit 311 to the software update unit 342, the cryptographic management unit 344, the call control unit 347, or the key exchange unit 348, based on the cryptographic class, the security protocol, the packet data, or the like. Details of the sorting and the like will be described below. The selector 341 also receives the data or the like output from the cryptographic management unit 344, the call control unit 347, or the key exchange unit 348, and outputs this data to the wired transmission and reception unit 311.

The software update unit 342 updates the cryptographic program (or cryptographic software) so that the updated cryptographic program received from the OPE 400 is executed in the security GW 300. The software update unit 342 includes, for example, a memory therein and updates the software by storing the received updated cryptographic program in the memory.

The soft encryption unit 343 reads out the cryptographic program from the software update unit 342 and executes the cryptographic program to perform the cryptographic processing, by means of software, on the packet data or the like received from the cryptographic management unit 344. The soft encryption unit 343 performs, for example, the cryptographic processing based on the AES.

The cryptographic management unit 344 outputs the packet data received from the selector 341 to the soft encryption unit 343, the cryptographic queue buffer 345, or the hard encryption unit 351, based on the cryptographic class or the like. When the data or the like on which the cryptographic processing is conducted is received from the soft encryption unit 343 or the hard encryption unit 351, the cryptographic management unit 344 also outputs the data to the selector 341. Details of the processing conducted in the cryptographic management unit 344 will be described below.

The cryptographic queue buffer 345 is a memory that stores the packet data or the like of the cryptographic processing target when the "software encryption by scheduling" is conducted by the soft encryption unit 343.

The cryptographic scheduler 346 calculates (schedules) a timing when the usage rate of the cryptographic processing conducted in the soft encryption unit 343 is lower than or equal to a threshold in a manner similar to the cryptographic scheduler 146 in the base station 100, and outputs the calculated timing to the cryptographic management unit 344. The cryptographic management unit 344 reads out, at this timing, the packet data or the like stored in the cryptographic queue buffer 345, and outputs the packet data to the soft encryption unit 343 so that the cryptographic processing is conducted on the packet data.

The call control unit 347 performs, for example, the processing related to the call connection between the security GW 300 and the base station 100 or between the security GW 300 and the remote node 600. The call control unit 347 controls the call connection by performing, for example, the generation or termination of the various messages for the call connection.

The key exchange unit 348 exchanges the key (SA negotiation) with the base station 100 by performing, for example, the generation or termination of the message or signal based on the key exchange protocol (for example, Internet Key Exchange (IKE)).

The SECURITY 350 includes the hard encryption unit 351. The hard encryption unit 351 performs the cryptographic processing, by means of hardware, on the data output from the cryptographic management unit 344. For example, the SECURITY 350 is a dedicated-use LSI configured to perform the cryptographic processing, and the hard encryption unit 351 is a part where the cryptographic processing is conducted in the above-mentioned the LSI. For example, in the case of the cryptographic processing by means of hardware conducted by the hard encryption unit 351, the security level is lower but the speed of the cryptographic processing is higher as compared with the cryptographic processing conducted by the soft encryption unit 343.

Remote Node 600

Figure 6:
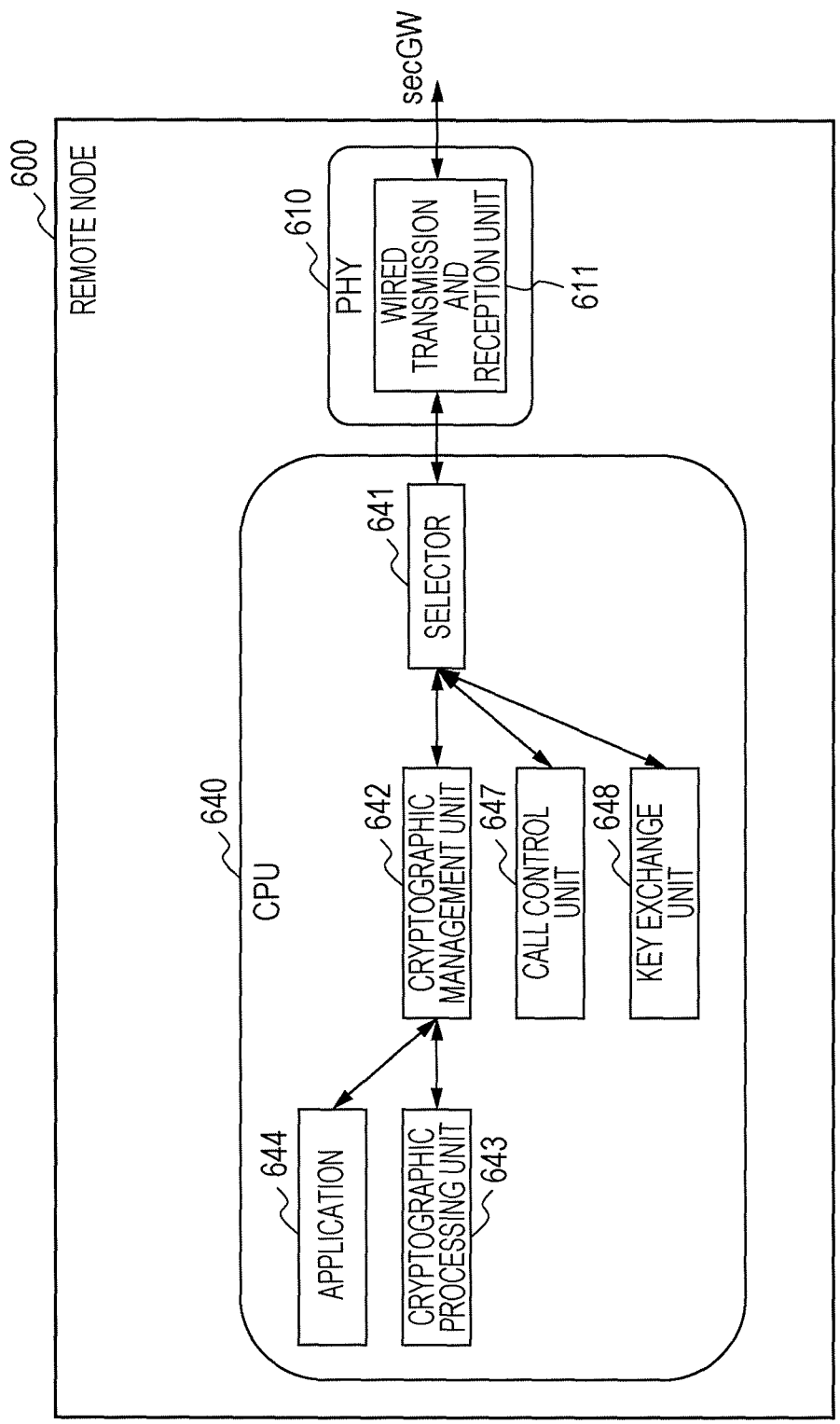
FIG. 6 illustrates a configuration example of a remote node, according to an embodiment.

Next, a configuration example of the remote node 600 will be described. FIG. 6 is a diagram illustrating a configuration example of a node, according to an embodiment. The remote node 600 includes a PHY 610 and a CPU 640.

The PHY 610 includes a wired transmission and reception unit 611. The wired transmission and reception unit 611 is coupled to the security GW 300 via the network 500 and transmits and receives the packet data or the like with the security GW 300. The wired transmission and reception unit 611 is also coupled to the CPU 640 and outputs the packet data received from the security GW 300 to the CPU 640 and also outputs the packet data output from the CPU 640 to the security GW 300.

The CPU 640 includes a selector 641, a cryptographic management unit 642, a cryptographic processing unit 643, an application 644, a call control unit 647, and a key exchange unit 648. These processing blocks in the CPU 640 are also, for example, function blocks that are realized when the CPU 640 executes the program.

The selector 641 outputs the packet data or the like output from the wired transmission and reception unit 611, to the cryptographic management unit 642, the call control unit 647, or the key exchange unit 648, based on the cryptographic class, the security protocol, or the like. This sorting will also be described below. The selector 641 also receives data or the like output from the cryptographic management unit 642, the call control unit 647, or the key exchange unit 648, and outputs the data to the wired transmission and reception unit 611.

The cryptographic management unit 642 outputs the packet data or the like received from the selector 641 to the application 644 or the cryptographic processing unit 643, based on the cryptographic class, the security class, or the like.

The cryptographic management unit 642 also outputs the data or the like received from the application 644 or the cryptographic processing unit 643 to the selector 641. Details of the sorting for the data or the like will also be described below.

The cryptographic processing unit 643 performs the cryptographic processing on the data received from the cryptographic management unit 642. In the second embodiment, the cryptographic processing unit 643 performs, for example, the "high security" cryptographic processing based on the AES.

The application 644 performs processing for the application layer. For example, the application 644 includes a microphone, a camera, or the like, and is configured to convert voice input via the microphone into voice data, or to convert video picked up by the camera into video data. The application 644 outputs the audio data, the video data, or the like to the cryptographic management unit 642. Further, the application 644 receives the data from the cryptographic management unit 642, and is configured to output the data as the voice from the speaker serving as the application 644 or to display the video on the screen.

The call control unit 647 performs, for example, processing related to the call connection between the remote node 600 and the security GW 300. The call control unit 647 controls a call connection by performing, for example, the generation or termination of the various messages for the call connection.

The key exchange unit 648 performs, for example, the generation or termination of a message based on the key exchange protocol (for example, Internet Key Exchange (IKE)) and exchanges the key (SA negotiation) with the communication terminal 200.

Operation Example

Next, an operation example will be described. To facilitate the understanding with regard to the operation example, an example of an operational sequence of the entire communication system 10 will first be described, and next, an example of an operational flowchart for the processing conducted in the base station 100 will be described.

Operational Sequence of the Entire Communication System 10

Figure 7:
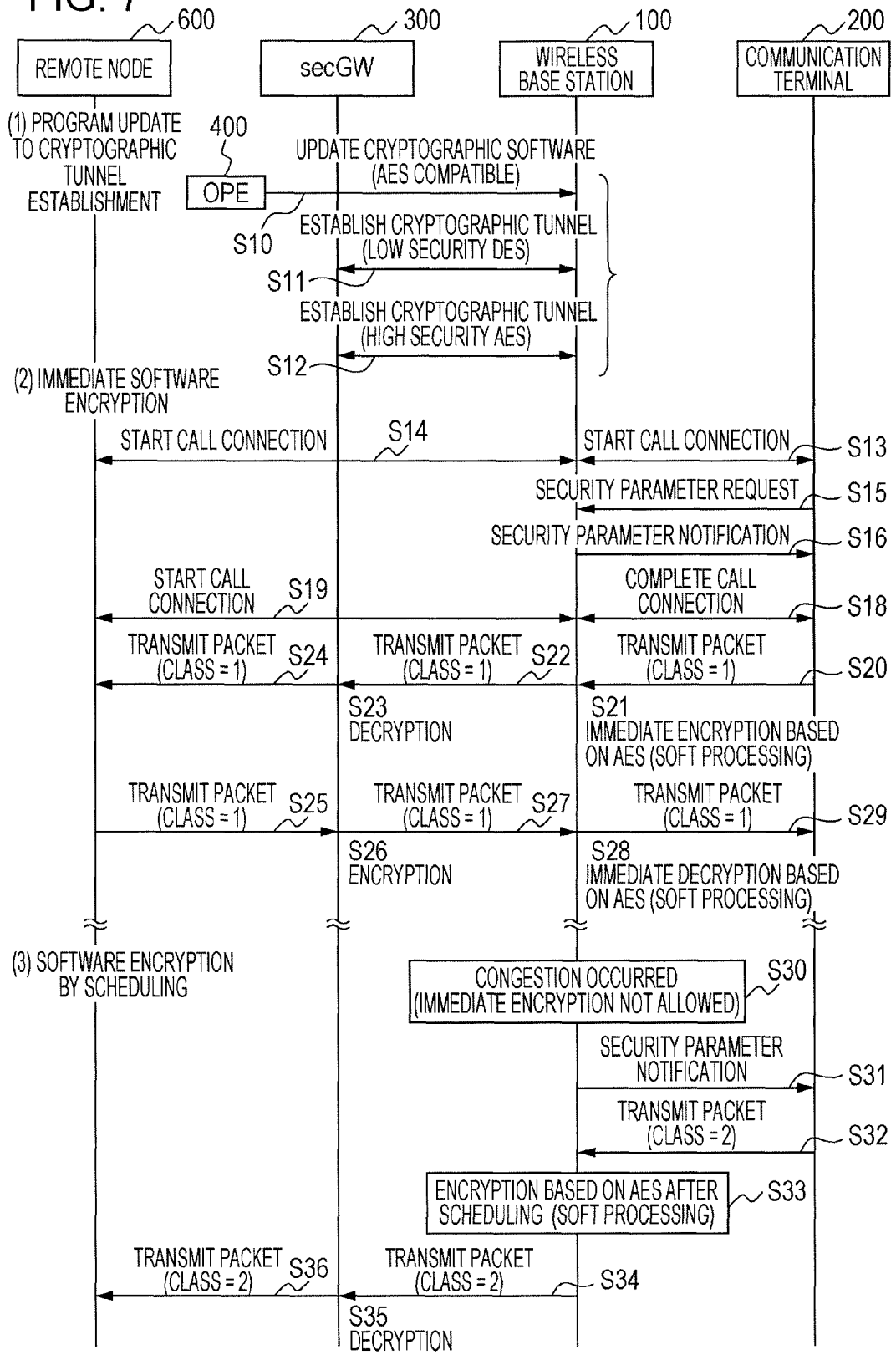

FIG. 7 and FIG. 8 are diagrams illustrating an example of an operational sequence of an entire communication system, according to an embodiment. The example of the operational sequence will be described, for example, in the following order.

That is, the base station 100 updates the cryptographic software to the latest version (S10 to S12), and the base station 100 and the security GW 300 utilize the updated cryptographic program to perform the "immediate software encryption" (S14 to S29). This allows the security of the communication path to be secured between the base station 100 and the security GW 300.

After that, when congestion occurs in the process of executing the program, for example, when the usage rate of the cryptographic processing by the updated cryptographic program exceeds a threshold in the base station 100, the base station 100 performs the "software encryption by scheduling" (S30 to S41). Although the cryptographic processing is conducted in the security GW 300, in the second embodiment, for example, the "software encryption by scheduling" is also conducted in the security GW 300. This allows the security of the communication path to be secured between the base station 100 and the security GW 300.

After that, when congestion occurs again in the base station 100, for example, when the buffer amount of the cryptographic queue buffer 145 exceeds a buffer threshold in the "software encryption by scheduling", the base station 100 performs the "hardware encryption" (S50 to S66). The "hardware encryption" is conducted also in the security GW 300, for example. In this case, the "high security" cryptographic processing is conducted between the communication terminal 200 and the remote node 600 (S53, S59, and the like). This allows the "high security" to be secured between the communication terminal 200 and the remote node 600.

Lastly, the congestion is recovered, and the base station 100 or the like performs a post-recovery operation (S70 to S81).

1. Operational Sequence from "Program Update" to "Cryptographic Tunnel Establishment"

First, processing such as the cryptographic software update will be described.

The base station 100 receives the updated cryptographic program transmitted from the OPE 400 via the security GW 300 and updates the cryptographic software (S10). For example, update to the latest cryptographic software is carried out through the reception of the cryptographic program based on the AES in the software update unit 142 of the base station 100. Also in the security GW 300, the same cryptographic program is received, and the cryptographic software is updated.

In the case, the base station 100 is configured to conduct "hardware encryption" based on the DES. The security GW 300 also is configured to conduct "hard encryption" based on the DES.

Therefor, the base station 100 and the security GW 300 establish two cryptographic tunnels including a cryptographic tunnel providing the "high security" based on the AES and a cryptographic tunnel providing the "low security" based on the DES so as to enable both the cryptographic processing based on the AES and the cryptographic processing based on the DES to be conducted.

The cryptographic tunnel establishment is conducted, for example, in the following manner. That is, the base station 100 establishes a control tunnel, by transmitting a tunnel establishment request or the like to the security GW 300, generating a private key by utilizing a Diffie-Hellman the key exchange system or the like, and generating an encryption key by utilizing variables exchanged with the security GW 300. Thereafter, the base station 100 establishes a cryptographic tunnel by generating another encryption key that is obtained by negotiating with the security GW 300 while utilizing the control tunnel. The base station 100 and the security GW 300 establish the above-mentioned cryptographic tunnel for each of two encryption systems of the "low security" and the "high security", thereby establishing the two cryptographic tunnels. The above-mentioned processing is carried out, for example, between the key exchange unit 148 of the base station 100 and the key exchange unit 348 of the security GW 300.

2. Operational Sequence of "Immediate Software Encryption"

After the cryptographic tunnel establishment (S11, S12), the base station 100 and the security GW 300 start a call connection (S13, S14).

For example, a message for starting the call connection is exchanged between the call control unit 147 of the base station 100 and the call control unit 247 of the communication terminal 200 (S13). A message for starting the call connection is also exchanged between the call control unit 147 of the base station 100 and the call control unit 647 of the remote node 600 (S14).

Subsequently, the communication terminal 200 transmits the security parameter request to the base station 100 (S15). For example, the communication terminal 200 generates and transmits the security parameter request upon receiving the message for the call connection.

FIG. 9A is a diagram illustrating an example of a security parameter request, according to an embodiment. The security parameter request includes, for example, security parameters requested by the communication terminal 200 from the base station 100. The security parameters are, for example, parameters utilized when the base station 100 or the like performs the cryptographic processing. The security parameters includes, for example, "service type", "candidate", "algorithm", "maximum rate", "queuing", and "cryptographic class" as illustrated in FIG. 9A.

"Service type" represents, for example, a type of a service to be provided (or communicated). Examples of the service type include, for example, a service related to a transmission of confidential packets with regard to a settlement of a bank, a card, or the like, a service related to a transmission of normal packets such as an electronic mail having a lower confidentiality than the confidential packets, a voice service such as a voice telephone call, a video streaming distribution service, and the like.

"Candidate" represents, for example, a candidate for a cryptographic class desired from the communication terminal 200 when a security is requested. In the example of FIG. 9A, a security pattern in which the service type is "confidential packet", the algorithm is "AES", the maximum rate is "0.1 Mbps", and the queuing is "not allowed" represents "first choice" as the candidate. For example, the "candidates" are represented in order from the "first choice" for each service type.

"Algorithm" represents, for example, a cryptographic algorithm used in the cryptographic processing. In the example of FIG. 9A, the "algorithm" includes "AES" and "DES". For example, a selection for the "algorithm" may be made, by the communication terminal 200, from among executable pieces of cryptographic processing.

"Maximum rate" represents, for example, the number of bits with which the processing is executable per unit time (for example, 1 second) for each cryptographic class. For example, "0.1 Megabit per second (Mbps)" represents that the cryptographic processing is executable on data equivalent to the data amount of maximum "0.1 Mbps".

"Queuing" represents, for example, whether or not the encryption based on the software is allowed after an elapse of a predetermined time. Alternatively, the "queuing" represents, for example, whether or not the processing subjected to buffering and queuing is allowed in a case where congestion of the processing of the "encryption based on the software" occurs in the base station 100. For example, a service based on a real-time aspect where the queuing is not allowed may be set at "not allowed" and a service based on not much of the real-time aspect where the queuing is allowed may be set at "allowed".

"Encryption class" represents, for example, an identifier for identifying the combination of security parameters as described above. This combination of security parameters may be referred to, for example, as a security pattern. For example, a cryptographic class "1" represents a security pattern of "confidential packet", "AES", "0.1 Mbps", and "not allowed" for the queuing, and a cryptographic class "2" represents a security pattern of the "confidential packet", "AES", "0.1 Mbps", and "allowed" for the queuing.

The generation and transmission of the above-mentioned security parameter request is conducted, for example, in the following manner. That is, the application 244 generates security parameters to be output to the class assigning unit 242, in accordance with the input operation by the user on the screen of the communication terminal 200. The class assigning unit 242 generates the security parameter request including the security parameters to be transmitted via the selector 241 or the like to the base station 100. At this time, the class assigning unit 242 adds information indicating the security parameter request to a header area or the like for the transmission.

The communication terminal 200 notifies, for example, the base station 100 of the desired request of the security parameters carried out for each service type by transmitting the security parameter request to the base station 100.

With reference to FIG. 7 again, when the security parameter request is received, the base station 100 generates the packet data including the security parameter notification (hereinafter, this packet data will be referred to as "security parameter notification"), and transmits the generated packet data to the communication terminal 200 (S16).

FIG. 9B is a diagram illustrating an example of a security parameter notification, according to an embodiment. The security parameter notification is obtained, for example, by adding the "result" to the security parameter request. The "result" represents, for example, a negotiation result for the desired request of the security parameters. For example, "OK" represents that the base station 100 allows (permits) desired requests of the respective security parameters, and "NG" represents that the base station 100 does not allow the desired requests. "-" represents that, for example, the determination is not yet made.

In the example of FIG. 9B, since the security parameters corresponding to the cryptographic class "1" is "OK", the security parameter request is allowed. For example, the cryptographic management unit 144 of the base station 100 generates a security parameter notification by assigning a result for the security parameter request. For example, the cryptographic management unit 144 assigns the "result" in the following manner.

That is, the cryptographic management unit 144 assigns the "result" bye taking into account the usage rate of the cryptographic program (for example, the AES) used in the "encryption based on the software". For example, a case will be considered in which the soft encryption unit 143 is able to perform the cryptographic processing on the data (for example, "1 Mbps") for up to eight users (or eight pieces of the communication terminals 200-1 to 200-8). In the above-mentioned case, the cryptographic management unit 144 accepts ("OK") security parameter requests until pieces of data for eight users are received and does not accept ("NG" or "-" standing for not determined yet) security parameter requests for the ninth and subsequent users. In this case, the cryptographic management unit 144 may determine, for example, whether or not the security parameter requests are accepted in accordance with the number of users for each service type.

The transmission and the reception of a security parameter notification are conducted in the following manner, for example. That is, the selector 141 receives a security parameter request from the wired transmission and reception unit 111 and outputs the request to the cryptographic management unit 144, based on the information added to the header area and indicating the security parameter information. The cryptographic management unit 144 generates a security parameter notification in response to the security parameter request, and transmits the generated security parameter notification to the communication terminal 200 via the selector 141 or the like as described above. At this time, the cryptographic management unit 144 adds information indicating the security parameter notification to the header area or the like for the transmission. When the security parameter notification is received, the selector 241 of the communication terminal 200 outputs the notification to the class assigning unit 242, based on the information added to the header area or the like and indicating the security parameter notification. The class assigning unit 242 holds the received security parameters in the internal or external memory. Thereafter, when the packet data or the like is transmitted, the class assigning unit 242 transmits the packet data by adding the cryptographic class to the header area thereof.

With reference to FIG. 7 again, the communication terminal 200 and the base station 100 subsequently complete the call connection (S18). The base station 100 and the remote node 600 also complete the call connection (S19). According to this, the processing for the call connection start (S13, S14) is completed, and the communication terminal 200 and the remote node 600 become able to exchange the packet data or the like with each other.

Also in this case, the call control unit 147 of the base station 100 and the call control unit 247 of the communication terminal 200 add information indicating that the message indicates the call connection completion and exchange the message (or packet data) with each other. The selector 141 of the base station 100 and the selector 241 of the communication terminal 200 sort out and output the received messages, based on the information added to the header, to the call control unit 147 and 247, respectively.

Subsequently, the communication terminal 200 transmits the packet data by utilizing the permitted security parameter (S20).

For example, the processing is conducted in the following manner when the communication terminal 200 transmits the "confidential packet". That is, the application 244 generates notification indicating the "confidential packet" and data to be included in the "confidential packet" in accordance with the input operation or the like by the user on the screen of the communication terminal 200. When the notification and the data are received from the application 244, the class assigning unit 242 searches for an encryption class corresponding to the "confidential packet", based on the security parameter notification (S16) held in the memory or the like. The class assigning unit 242 then generates the packet data including the cryptographic class "1" in the header area and the data of the "confidential packet" in the payload area, and transmits the generated packet data to the base station 100. Also as for the other service types, when the class assigning unit 242 receives the notification and the data from the application 244, the class assigning unit 242 searches for a cryptographic class, based on the security parameter notification, generates the packet data including the cryptographic class "4", "5", or the like, and transmits the generated packet to the base station 100.

In a case where the transmitted packet data is the IP packet data, for example, a cryptographic class may be included in an option in the header area or may be associated with a cryptographic class using a differentiated service code point (DSCP) value inserted into a type of service (ToS) in the header area.

An example in which the "confidential packet" is transmitted and received as a type of the packet data will be described below.

When the packet data is received from the communication terminal 200, the base station 100 performs the encryption based on the AES (S21).

For example, when it is confirmed that the header area of the packet data includes a cryptographic class, the selector 141 of the base station 100 outputs the packet data to the cryptographic management unit 144. The cryptographic management unit 144 extracts the cryptographic class from the header area of the packet data and selects or determines to perform at least one of options of the "immediate software encryption", the "software encryption by scheduling", and the "hardware encryption", based on the extracted cryptographic class. The cryptographic management unit 144 then outputs the packet data to one of the soft encryption unit 143, the cryptographic queue buffer 145, and the hard encryption unit 151, depending on the selected result.

In a case where the extracted cryptographic class is "1", for example, the encryption based on the "AES" is conducted as illustrated in FIG. 9B, and the queuing is "not allowed". In this case, since the encryption based on the "AES" is the "high security" and scheduling is not to be conducted, the cryptographic management unit 144 selects the "immediate software encryption". The cryptographic management unit 144 holds the security parameter notification as illustrated in FIG. 9B in the internal or external memory or the like and conducts the determination based on this security parameter notification. The cryptographic management unit 144 then outputs the packet data received from the selector 141 to the soft encryption unit 143. The soft encryption unit 143 performs the encryption processing by means of the AES on the packet data received from the cryptographic management unit 144, thereby performing the "immediate software encryption".

With reference to FIG. 7 again, the base station 100 then transmits the encrypted packet data to the security GW 300 (S22).

For example, the base station 100 generates the IP packet data including the cryptographic class in the header area by copying the cryptographic class (for example, the cryptographic class "1") received from the communication terminal 200 into an outer IP header, and transmits the generated IP packet data. This processing is conducted, for example, in the following manner.

That is, the soft encryption unit 143 outputs the encrypted packet data to the wired transmission and reception unit 111 via the cryptographic management unit 144 or the like. The cryptographic management unit 144 also outputs the cryptographic class extracted when the packet data is received (S20) to the wired transmission and reception unit 111. The wired transmission and reception unit 111 generates the IP packet data including the encrypted packet data in the payload area and the extracted cryptographic class in the header area, and transmits this IP packet data to the security GW 300.

When the packet data is received, the security GW 300 decrypts the encrypted data (S23).

The selector 341 receives the IP packet data from the wired transmission and reception unit 311 and outputs the IP packet data to the cryptographic management unit 344, based on the cryptographic class or the like included in the header area, for example. The cryptographic management unit 344 extracts the cryptographic class (for example, the cryptographic class "1") from the header area and extracts the data (packet data that has been immediately encrypted using the AES in the base station 100) from the payload area. The cryptographic management unit 344 then outputs the extracted data to one of the soft encryption unit 343, the cryptographic queue buffer 345, and the hard encryption unit 351, based on the extracted cryptographic class.

For example, since the encryption is based on the "AES" and the queuing is "not allowed" when the cryptographic class is "1", the cryptographic management unit 344 confirms that the encryption is the "immediate software encryption". The cryptographic management unit 344 then outputs the extracted data to the soft encryption unit 343. The soft encryption unit 343 performs, for example, the decryption processing corresponding to the AES to decrypt the encrypted packet data.

Subsequently, the security GW 300 transmits the decrypted packet data to the remote node 600 (S24).

The soft encryption unit 343 outputs the decrypted packet data to the wired transmission and reception unit 311 via the cryptographic management unit 344 or the like, for example. The wired transmission and reception unit 311 transmits the decrypted packet data to the remote node 600.

When the packet data is received, the remote node 600 generates a response packet responsive to the packet data and adds the cryptographic class to the response packet which is transmitted (S25).

For example, the selector 641 of the remote node 600 outputs the received IP packet data to the cryptographic management unit 642, based on the cryptographic class included in the header area of the IP packet data or the like received via the wired transmission and reception unit 611. The cryptographic management unit 642 extracts, for example, the cryptographic class from the header area and outputs the data included in the payload area to the application 644. The application 644 generates, for example, response data including information indicating that the packet data (for example, the "confidential packet") is normally received, not normally received, or the like, and outputs the response data to the cryptographic management unit 642. The cryptographic management unit 642 outputs the extracted cryptographic class and the response data received from the application 644 to the wired transmission and reception unit 611 via the selector 641. The wired transmission and reception unit 611 generates, for example, the IP packet data including the cryptographic class (for example, the cryptographic class "1") in the header area and the response data in the payload area and transmits the IP generated packet data toward the security GW 300.

When the packet data transmitted from the remote node 600 is received, the security GW 300 encrypts the received packet data (S26).

For example, the cryptographic management unit 344 outputs the received IP packet data to the soft encryption unit 343, based on the cryptographic class included in the header area of the IP packet data (for example, the cryptographic class "1"). The soft encryption unit 343 performs the cryptographic processing by means of the AES on the received IP packet data.

Subsequently, the security GW 300 transmits the encrypted packet data to the base station 100 (S27).

In this case, the security GW 300 transmits, for example, the encrypted packet data by using the outer IP header of the encrypted packet data. For example, the security GW 300 performs the following processing.

That is, the soft encryption unit 343 outputs the encrypted packet data to the cryptographic management unit 344, and the cryptographic management unit 344 outputs the cryptographic class extracted when the IP packet data is received and the encrypted data, via the selector 341, to the wired transmission and reception unit 311. The wired transmission and reception unit 311 generates the IP packet data including the cryptographic class in the header area and the encrypted data in the payload area and transmits the generated IP packet data to the base station 100.

When the packet data transmitted from the security GW 300 is received, the base station 100 performs the "immediate software encryption" based on the AES (S28).

For example, when the packet data is received from the wired transmission and reception unit 111, the selector 141 outputs the received packet data to the cryptographic management unit 144, based on the cryptographic class or the like included in the header area. The cryptographic management unit 144 extracts the data (packet data encrypted in the security GW 300) from the payload area of the packet data and outputs the extracted data to the soft encryption unit 143, based on the cryptographic class (for example, the cryptographic class "1") added to the header of the packet data. The soft encryption unit 143 then applies the decryption processing based on the AES to the data received from the cryptographic management unit 144.

Subsequently, the base station 100 transmits the decrypted packet data to the communication terminal 200 (S29).

The soft encryption unit 143 outputs the decrypted packet data to the wired transmission and reception unit 111 via the cryptographic management unit 144 or the like, for example. The wired transmission and reception unit 111 transmits the decrypted packet data to the communication terminal 200 via the baseband unit 221 or the like. In this case, the decrypted packet data is subjected, for example, to the error correction coding processing, the modulation processing, the conversion processing into the wireless signal, or the like and transmitted as the wireless signal to the communication terminal 200.

When the packet data is received (S29), for example, the communication terminal 200 performs the following processing. That is, the transmission and reception unit 211 extracts the IP packet data on which the demodulation processing or the like has been conducted, by outputting the received wireless signal to the baseband unit 221, and outputs the extracted IP packet data to the selector 241. When it is confirmed that the cryptographic class is included in the header of the received IP packet data, the selector 241 outputs the IP packet data to the class assigning unit 242. The class assigning unit 242 extracts the data included in the payload area of the IP packet data (response data or the like generated in the remote node 600), and outputs the extracted data to the application 244.

3. "Software Encryption by Scheduling"

Congestion may occur with regard to the cryptographic processing by means of software since pieces of encryption target data or the like are received in a concentrated manner when the base station 100 performs the "immediate software encryption". In the above-mentioned case, the base station 100 does not perform the "immediate software encryption" any longer. In view of the above, according to the second embodiment, the occurrence of congestion is avoided by changing the processing from the "immediate software encryption" to the "software encryption by scheduling". Hereinafter, a description will be given of the processing for the "software encryption by scheduling".

The base station 100 detects an occurrence of congestion (S30). For example, the cryptographic management unit 144 of the base station 100 measures the usage rate of the software encryption processing in the soft encryption unit 143 and detects that congestion occurs with regard to the processing by the "immediate software encryption" when the usage rate exceeds the threshold. For example, in a case where the usage rate of the software cryptographic processing is set as the amount of data on which the cryptographic software processing is conducted per unit time, the cryptographic management unit 144 conducts the determination depending on whether or not the amount of data output to the soft encryption unit 143 (for example, the data amount equivalent to 1 Mbps) exceeds the threshold. For that reason, the cryptographic management unit 144 measures, for example, the amount of data output to the soft encryption unit 143.

When the occurrence of congestion is detected, the base station 100 changes the security parameter and transmits notification of the changed security parameter to the communication terminal 200 (S31).

For example, FIG. 10A illustrates an example of the security parameter notification after the change. Since the queuing is "allowed" with regard to the cryptographic class "2", in order that the base station 100 permits the encryption with regard to this cryptographic class, the base station 100 assigns "OK" to the "result". On the other hand, the base station 100 assigns "NG" with regard to the security parameter whose cryptographic class is "1". This prevents the base station 100 from performing the "immediate software encryption" on the "confidential packet", thereby avoiding congestion.

In the example of FIG. 10A, the base station 100 sets a situation where the security parameters are allowed as they are with regard to the "normal packet", the "voice", and the "stream". This is because the communication terminal 200 does not desire the "software encryption by scheduling" with regard to the "normal packet", the "voice", and the "stream". Therefore, for example, when the security parameter whose queuing is "allowed" in the "normal packet" exists, the base station 100 sets this parameter as "OK" and sets the security parameter whose queuing is "not allowed" as "NG".

In this manner, the base station 100 allows, for example, the cryptographic class whose queuing is "allowed" among the security parameters and changes the security parameter so as not to permit a cryptographic class that allows the "immediate software encryption" in the same service type. The above-mentioned processing is conducted, for example, in the cryptographic management unit 144.

With reference to FIG. 7 again, the communication terminal 200 receives the security parameter notification after the change and transmits the packet data including the cryptographic class after the change (S32).

The class assigning unit 242 holds the security parameter after the change received from the base station 100 in the internal or external memory or the like, for example. When data related to the "confidential packet" is received from the application 244, the class assigning unit 242 generates packet data including a cryptographic class "2" in the header area and the received data in the payload area. The class assigning unit 242 transmits the generated packet data to the base station 100 via the selector 241 or the like.

When the packet data is received, the base station 100 performs scheduling, and performs the cryptographic processing based on the AES at the scheduled time (S33).

For example, the following processing is conducted in the base station 100. That is, when it is confirmed that a cryptographic class is included in the header area of the received packet data, the selector 141 outputs the packet data to the cryptographic management unit 144. The cryptographic management unit 144 extracts the cryptographic class from the header area of the packet data. When it is confirmed that the cryptographic class is a cryptographic class indicating the "hard encryption", based on the security parameter notification after the change which is held in the memory or the like (S31), the cryptographic management unit 144 then outputs the packet data to the hard encryption unit 151. In the example of FIG. 10A, the cryptographic management unit 144 outputs the packet data having the cryptographic class "2" to the cryptographic queue buffer 145. In this case, the cryptographic management unit 144 outputs the packet data having the cryptographic classes "4" to "6" to the hard encryption unit 151.

The cryptographic management unit 144 may output the received packet data to the security GW 300 without encryption, for example, when the extracted cryptographic class is a cryptographic class not permitted in the processing in S31 or a cryptographic class not indicating the "soft encryption by the scheduling".

The cryptographic scheduler 146 then calculates (or schedules) a timing, for example, at which the cryptographic management unit 144 is to read out the packet data stored in the cryptographic queue buffer 145 for the encryption.

With regard to the scheduling, for example, the following processing is conducted. That is, when the IP packet data is stored in the cryptographic queue buffer 145, the cryptographic management unit 144 of the base station 100 notifies the cryptographic scheduler 146 of that effect. Upon receiving the notification, the cryptographic scheduler 146 calculates a time when the usage rate becomes lower than or equal to the threshold from its usage rate transition, based on the usage rate of the software encryption processing in the soft encryption unit 143, which is continually notified from the cryptographic management unit 144. The cryptographic scheduler 146 notifies the cryptographic management unit 144 of the calculated time. The cryptographic management unit 144 reads out the packet data from the cryptographic queue buffer 145 when the time arrives, and outputs the packet data to the soft encryption unit 143.

The soft encryption unit 143 then encrypts the received packet data. In this case, the soft encryption unit 143 performs the encryption based on the AES.

Next, the base station 100 transmits the encrypted packet data to the security GW 300 (S34).

The soft encryption unit 143 outputs the encrypted data to the cryptographic management unit 144, for example. When the packet data is received from the selector 141 (S32), the cryptographic management unit 144 outputs the extracted cryptographic class and the encrypted data received from the soft encryption unit 143 to the wired transmission and reception unit 111 via the selector 141. The wired transmission and reception unit 111 generates the IP packet data including the cryptographic class in the header area and the encrypted data in the payload area and transmits the IP packet data to the security GW 300. The base station 100 performs the above-mentioned processing by using the outer IP header.

Upon receiving the packet data from the base station 100, the security GW 300 decrypts the encrypted packet data (S35).

For example, when the packet data transmitted from the base station 100 is received from the selector 341, the cryptographic management unit 344 of the security GW 300 extracts the cryptographic class included in the header area of the IP packet data. The cryptographic management unit 344 then extracts the data included in the payload area of the IP packet data (encrypted packet data) and outputs the extracted data to the soft encryption unit 343 to decrypt the encrypted packet data.

In this case, also in the security GW 300, the processing by the scheduling may be conducted similarly as in the base station 100. For example, the cryptographic management unit 344 of the security GW 300 extracts the cryptographic class "2" included in the header area when the IP packet data is received from the selector 341. When it is confirmed that the cryptographic class "2" is the "soft encryption by the scheduling", the cryptographic management unit 344 then stores the data included in the payload area (encrypted packet data) in the cryptographic queue buffer 345. The cryptographic scheduler 346 calculates (or schedules) a timing (or time) at which the packet data is to be read out from the cryptographic queue buffer 345 and notifies the cryptographic management unit 344 of the timing or time similarly as in the cryptographic scheduler 146 of the base station 100. The cryptographic management unit 344 reads out the data from the cryptographic queue buffer 345 when the time arrives, and outputs the data to the soft encryption unit 343 to decrypt the encrypted packet data. In order to perform the above-mentioned processing, for example, the base station 100 may transmit the security parameter notification transmitted to the communication terminal 200 (S31), to the security GW 300, so that the notification is held in the cryptographic management unit 344.

Next, the security GW 300 transmits the decrypted packet data to the remote node 600 (S36).

For example, the cryptographic management unit 344 of the security GW 300 receives the decrypted packet data from the soft encryption unit 343, and transmits the decrypted packet data to the remote node 600 via the selector 341 or the like.

The remote node 600 then generates packet data including the response data responsive to the received packet data, and transmits the generated packet data to the security GW 300 (S37 of FIG. 8).

Next, the security GW 300 encrypts the packet data received from the remote node 600 (S38).

Also in this case, for example, the security GW 300 may perform either the "encryption by the scheduling" or the "immediate software encryption". For example, the soft encryption unit 343 performs the encryption based on the AES on the packet data transmitted from the remote node 600.

The security GW 300 subsequently transmits the packet data including the encrypted data to the base station 100 (S39).

For example, the wired transmission and reception unit 311 generates the IP packet data that includes the encrypted data (or the packet data transmitted from the remote node 600) in the payload area and the cryptographic class extracted upon the reception in the header area, and transmits the generated IP packet data to the base station 100.

Upon receiving the packet data from the security GW 300, the base station 100 performs the scheduling, and performs the decryption based on the AES (S40).

Also in this case, similarly as in the encryption by the scheduling (S33), for example, the cryptographic management unit 144 stores the data included in the payload area of the received IP packet data, in the cryptographic queue buffer 145, based on the cryptographic class (packet data encrypted in the security GW 300). The cryptographic scheduler 146 calculates a timing at which the usage rate of the soft encryption processing in the soft encryption unit 143 becomes lower than or equal to a threshold, and the cryptographic management unit 144 reads out the data from the cryptographic queue buffer 145 at the calculated timing so as to output the data to the soft encryption unit 143.

It is noted that the above-mentioned scheduling is conducted on the packet data whose cryptographic class is "2" in the example of FIG. 10A, and with regard to the packet data whose cryptographic classes are "4" to "6", the cryptographic management unit 144 does not output the packet data to the cryptographic queue buffer 145 but outputs the packet data to the hard encryption unit 151.

The base station 100 subsequently transmits the decrypted packet data to the communication terminal 200 (S41). For example, when the decrypted packet data is received from the soft encryption unit 143, the cryptographic management unit 144 transmits the packet data to the communication terminal 200 via the selector 141 or the like. In the communication terminal 200, for example, it is possible to extract the response data generated in the remote node 600.

4. "Hardware Encryption"

The amount of data stored in the cryptographic queue buffer 145 may exceed the buffer threshold since pieces of data of the cryptographic processing target or the like are received in a concentrated manner when the base station 100 performs the "soft encryption by the scheduling". In the above-mentioned case, congestion occurs in the base station 100, and the base station 100 enters a state in which the processing of the "soft encryption by the scheduling" is unable to be performed. In view of the above, according to the second embodiment, the occurrence of congestion may be avoided by changing the cryptographic processing from the "soft encryption by the scheduling" to the "hardware encryption". Hereinafter, a description will be given of the "hardware encryption".

The base station 100 detects the occurrence of congestion with regard to the processing on the "software encryption by scheduling" (S50). For example, the cryptographic management unit 144 measures the amount of data stored in the cryptographic queue buffer 145 and detects the occurrence of congestion when the data amount exceeds the buffer threshold.

Subsequently, the base station 100 transmits the security parameter notification after the change to the communication terminal 200 (S51).

FIG. 10B is a diagram illustrating an example of a security parameter notification after change, according to an embodiment. The base station 100 sets, for example, the security parameter by the "AES" as "NG" and the security parameter by the "DES" as "OK". In the example of FIG. 10B, among the security parameters related to the "confidential packet", the results for the cryptographic classes "1" and "2" are set as "NG", and the result for the cryptographic class "3" is set as "OK" since the algorithm is the "DES". For example, the cryptographic management unit 144 generates the security parameters after the change, and transmits the generated security parameters to the communication terminal 200.

With reference to FIG. 8 again, upon receiving the security parameter notification after the change, the communication terminal 200 establishes a cryptographic tunnel providing the "high security", with the remote node 600, based on the notification result (S52).

When the security parameter notification after the change is received from the selector 241 and it is confirmed that the "DES" at the cryptographic class "3" is "OK", for example, the key exchange unit 248 of the communication terminal 200 determines that the encryption based on the AES, which provides a higher security than the DES, is to be conducted. The key exchange unit 248 of the communication terminal 200 and the key exchange unit 648 of the remote node 600 then perform the SA negotiation to establish the cryptographic tunnel providing the "high security" and exchange the message related to the key exchange or the like, so that the cryptographic tunnel providing the "high security" is established.

Since the "low security" encryption is conducted between the base station 100 and the security GW 300, for example, it is possible to secure the high security as the entire communication path by conducting the "high security" encryption between the communication terminal 200 and the remote node 600.

When the cryptographic tunnel is established between the communication terminal 200 and the remote node 600, the communication terminal 200 performs the encryption on the packet data or the like transmitted to the remote node 600 (S53).

For example, upon receiving the notification of the cryptographic tunnel establishment from the key exchange unit 248 via the selector 241, the class assigning unit 242 outputs, when data generated in the application 244 is received, the data to the cryptographic processing unit 243. The cryptographic processing unit 243 performs the encryption based on the AES, for example.

Subsequently, the communication terminal 200 transmits the encrypted packet data to the base station 100 (S54).

The class assigning unit 242 receives the encrypted data from the cryptographic processing unit 243 and generates the packet data including this data in the payload area, for example. At this time, the class assigning unit 242 adds the cryptographic class of the security parameter notification, to the header area of the packet data. When the data is related to the "confidential packet", for example, the class assigning unit 242 adds the cryptographic class "3" to the data for the transmission. In this case, when the data is related to the "normal packet", the class assigning unit 242 adds the cryptographic class "4" or the like to the data for the transmission.

Upon receiving the packet data from the communication terminal 200, the base station 10 performs the "hardware encryption" processing on the packet data (S55).

For example, the cryptographic management unit 144 of the base station 100 extracts the cryptographic class included in the header area of the packet data received from the communication terminal 200. When it is confirmed that the cryptographic class is a cryptographic class indicating the "hard encryption", based on the security parameter notification after the change which is held in the memory or the like (S51), the cryptographic management unit 144 then outputs the received packet data to the hard encryption unit 151. In the example of FIG. 10B, the cryptographic management unit 144 outputs the packet data having the cryptographic classes "3" to "6", to the hard encryption unit 151. The hard encryption unit 151 performs the encryption based on the DES, on the received packet data.

In this case, for example, when the cryptographic class does not indicate the "hard encryption", the cryptographic management unit 144 may also output the received packet data to the security GW 300 without encryption.

Subsequently, the base station 100 transmits the packet data on which the encryption based on the DES has been conducted, to the security GW 300 (S56).

When the encrypted data (packet data transmitted from the communication terminal 200) is received from the hard encryption unit 151, for example, the cryptographic management unit 144 outputs the data to the wired transmission and reception unit 111 via the selector 141. The cryptographic management unit 144 also outputs the cryptographic class extracted upon reception thereof (for example, "3") to the wired transmission and reception unit 111 via the selector 141. The wired transmission and reception unit 111 generates the IP packet data that includes the encrypted data in the payload area and the cryptographic class in the header area, and transmits the generated IP packet data to the security GW 300.

When the packet data transmitted from the base station 100 is received, the security GW 300 performs decryption processing based on the DES (S57).

For example, when the packet data transmitted from the base station 100 is received from the selector 341, the cryptographic management unit 344 of the security GW 300 extracts the cryptographic class (for example, "3") from the header area to check the cryptographic class of the packet data. The cryptographic management unit 344 then extracts data stored in the payload area of the received packet data (packet data on which the hard encryption has been conducted in the base station 100) and outputs the extracted data to the hard encryption unit 351, based on the cryptographic class. The hard encryption unit 151 applies decryption processing based on the DES to the received data. This allows the security GW 300 to obtain the data before the hard encryption in the base station 100 (packet data transmitted from the communication terminal 200), for example.

Subsequently, the security GW 300 transmits the packet data to the remote node 600 (S58).

When the data after the decryption (packet data transmitted from the communication terminal 200) is received from the hard encryption unit 351, for example, the cryptographic management unit 344 outputs the data to the wired transmission and reception unit 311 via the selector 341. The cryptographic management unit 344 also outputs the cryptographic class (for example, "3") extracted when the packet data is received, to the wired transmission and reception unit 311. The wired transmission and reception unit 311 generates the IP packet data that includes the decrypted data (packet data transmitted from the communication terminal 200) in the payload area and the cryptographic class in the header area, and transmits the generated IP packet data to the remote node 600.

When the packet data transmitted from the security GW 300 is received, the remote node 600 decrypts the data included in the packet data (S59).

For example, the cryptographic management unit 642 of the remote node 600 extracts the cryptographic class from the header area of the IP packet data transmitted from the security GW 300 and outputs the data included in the payload area of the IP packet data (data on which the encryption based on the AES has been conducted in the communication terminal 200) to the cryptographic processing unit 643. The cryptographic processing unit 643 performs the decryption based on the AES, on the data received from the cryptographic management unit 642. The decrypted data is the data in a state before the encryption based on the AES has been conducted in the communication terminal 200 and is output from the cryptographic processing unit 643 via the cryptographic management unit 642 to the application 644.

Subsequently, the remote node 600 generates the response data and performs the encryption based on the AES on the response data (S60).

The response data is generated in the application 644, for example, and when the cryptographic management unit 642 receives the response data, the cryptographic management unit 642 outputs the response data to the cryptographic processing unit 643. The cryptographic processing unit 643 performs, for example, the encryption processing based on the AES on the response data.

Subsequently, the remote node 600 transmits the packet data to the security GW 300 (S61).

For example, when the encrypted response data is received from the cryptographic processing unit 643, the cryptographic management unit 642 outputs the response data to the wired transmission and reception unit 611 via the selector 641. The cryptographic management unit 642 also outputs the cryptographic class extracted through the processing in S59, to the wired transmission and reception unit 611 via the selector 641. The wired transmission and reception unit 611 generates the IP packet data that includes the encrypted response data in the payload area and the cryptographic class in the header area, and transmits to the generated IP packet data to the security GW 300.

When the packet data is received from the remote node 600, the security GW 300 performs the encryption based on the DES (S62). For example, the hard encryption unit 351 encrypts the packet data transmitted from the remote node 600 by using the DES.

The security GW 300 subsequently transmits the packet data including the encrypted data to the base station 100 (S63).

For example, when the packet data is received (S61), the cryptographic management unit 344 outputs the extracted cryptographic class and the data encrypted using the DES in the hard encryption unit 351 (packet data transmitted from the remote node 600) to the wired transmission and reception unit 311 via the selector 341. The wired transmission and reception unit 311 generates the IP packet data that includes the data encrypted based on the DES in the payload area and the cryptographic class in the header area, and transmits the generated IP packet data to the base station 100.

The base station 100 decrypts the packet data by using the DES when the packet data is received from the security GW 300 (S64). For example, the hard encryption unit 151 decrypts the data included in the payload area of the IP packet data transmitted from the security GW 300 (packet data transmitted from the remote node 600) by using the DES.

The base station 100 subsequently transmits the packet data to communication terminal 200 (S65). For example, the wired transmission and reception unit 111 generates the IP packet data that includes the decrypted packet data in the payload area and the cryptographic class extracted upon the reception in the header area, and transmits the generated IP packet data to the communication terminal 200.

When the packet data transmitted from the base station 100 is received, the communication terminal 200 performs the decryption processing with the remote node 600 (S66).

For example, the class assigning unit 242 outputs data included in the payload area of the packet data transmitted from the base station 100, to the cryptographic processing unit 243, and the cryptographic processing unit 243 decrypts the data by using the AES. The data after the decryption is, for example, the response data in a state before the encryption has been conducted in the remote node 600 and is output to the application 244 via the class assigning unit 242.

5. "Encryption Upon Recovery"

In the base station 100, the congestion state may be recovered when the amount of encryption target data is decreased from the data amount in the congestion state. In the above-mentioned case, according to the second embodiment, the "immediate software encryption" is realized so that the communication is carried out at the cryptographic class desired by the communication terminal 200.

For example, the cryptographic management unit 144 of the base station 100 determines that the congestion state is recovered when the usage rate of the software cryptographic processing in the soft encryption unit 143 becomes lower than or equal to the threshold. This determination causes the cryptographic management unit 144 to read out the security parameters held in the memory or the like through the processing in S15 and to generate the security parameter notification including these parameters. The cryptographic management unit 144 then transmits the generated security parameter notification (S71). For example, the base station 100 transmits the security parameter notification illustrated in FIG. 9B to the communication terminal 200.

According to this, the base station 100 is able to transmit the cryptographic class that is desired by the communication terminal 200 for the first time, to the communication terminal 200. For example, the cryptographic management unit 144 and the class assigning unit 242 hold the security parameter notification after the change in the memory, and the security parameter notification is used at the time of the transmission and reception of the packet data.

After that, the processing same as the "immediate encryption based on the software" is conducted (S72 to S81), and the encryption at the cryptographic class desired by the communication terminal 200 is carried out.

Operation Example in the Base Station 100

Figure 11:
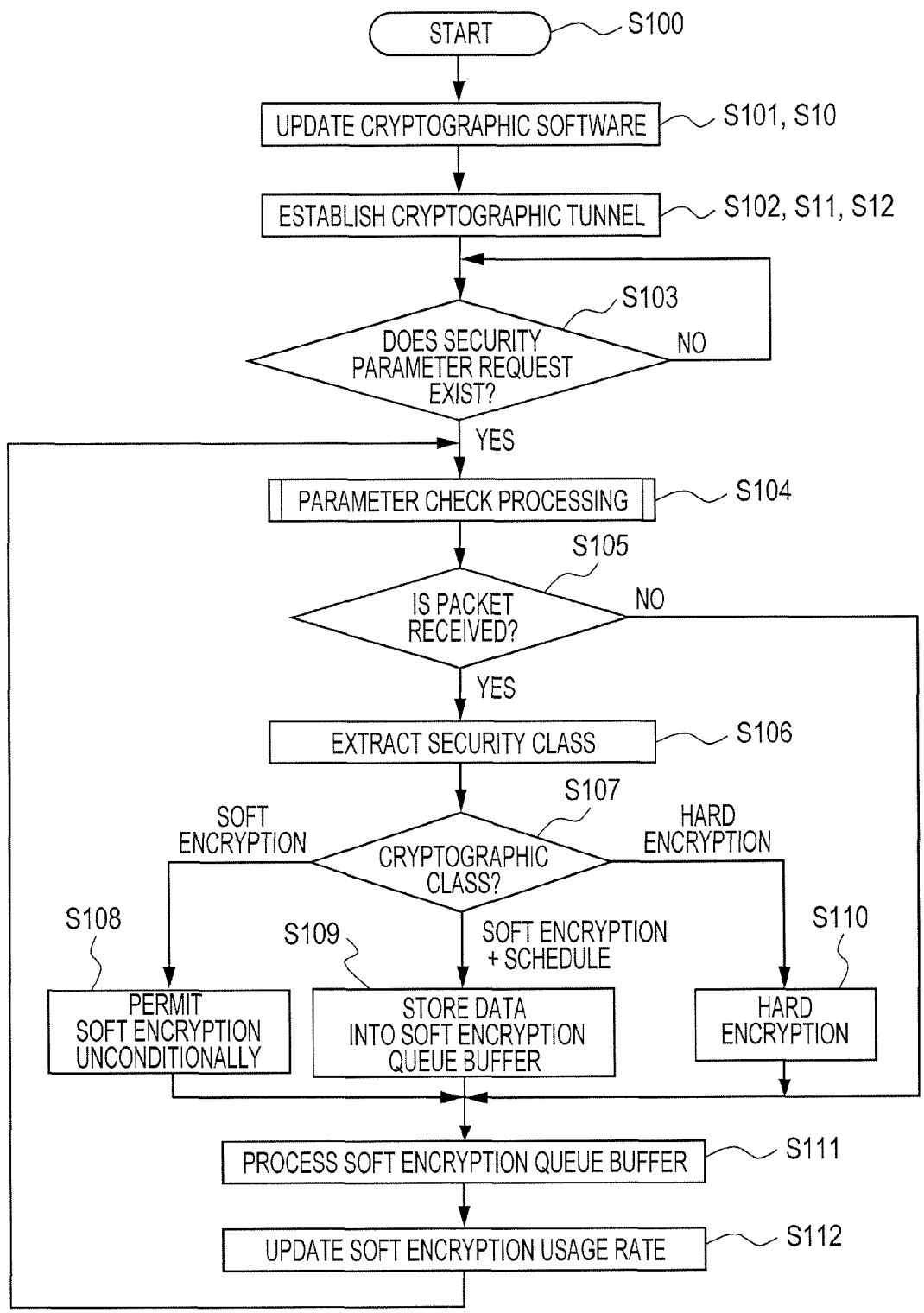
FIG. 11 is a diagram illustrating an example of an operational flowchart for a base station, according to an embodiment.

Next, an operation example in the base station 100 will be described. FIG. 11 is a diagram illustrating an example of an operational flowchart for a base station, according to an embodiment. Since the description is overlapped with the sequence examples illustrated in FIG. 7 and FIG. 8, the description will be simply given below.

When the base station 100 starts the processing (S100), the cryptographic software is updated (S101). For example, the base station 100 downloads the updated cryptographic program (for example, the cryptographic program based on the AES system) from the OPE 400 and stores the downloaded cryptographic program in the memory or the like in the software update unit 142.

Subsequently, the base station 100 establishes the cryptographic tunnel with the security GW 300 (S102). The base station 100 establishes, for example, the cryptographic tunnel providing the "high security" (the cryptographic tunnel to be used for the downloaded AES) and the cryptographic tunnel providing the "low security" (the cryptographic tunnel to be used for the DES utilized by the hardware).

Subsequently, the base station 100 determines whether or not the security parameter request (or the security parameter notification) is received from the communication terminal 200 (S103). The base station 100 stands by until the security parameter notification is received (S103: loop for No). When the security parameter notification is received, the base station 100 performs parameter check processing (S104).

Figure 12:
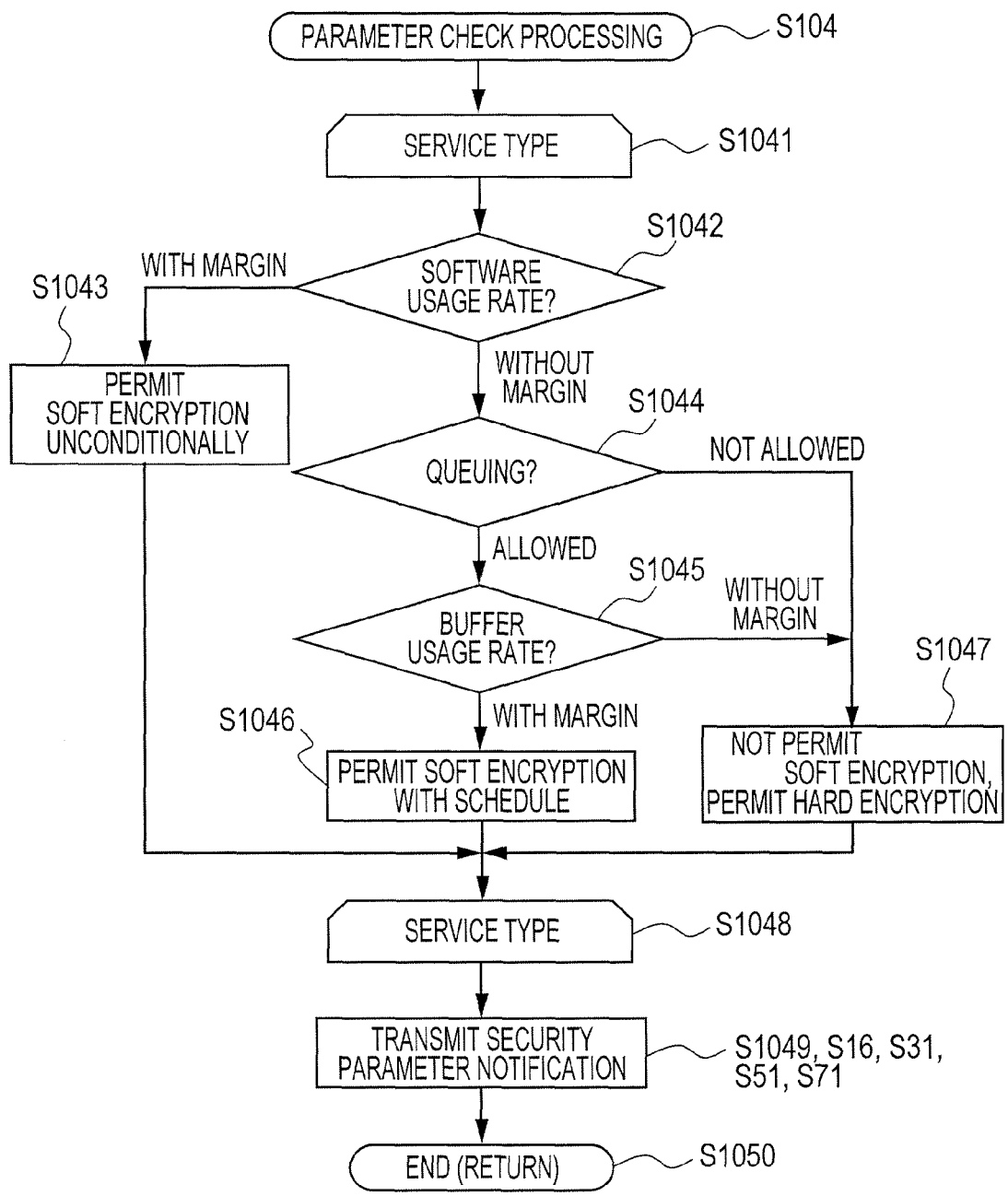
FIG. 12 is a diagram illustrating an example of an operational flowchart for parameter check processing, according to an embodiment.

FIG. 12 is a diagram illustrating an example of an operational flowchart for security parameter check processing, according to an embodiment. When the parameter check processing is started (S104), the base station 100 checks the service type of the received security parameter request (S1041).

For example, the security parameter request illustrated in FIG. 9A is received, the base station 100 confirms that "confidential packet", "normal packet", "voice packet", and "stream" exist as the service types. This checking is conducted, for example, in the cryptographic management unit 144. The base station 100 then performs the processing in S1042 to S1047 for each service type.

That is, the base station 100 determines whether or not the software usage rate has a margin in S1042 (S1042). For example, the cryptographic management unit 144 calculates the usage rate of the encryption processing based on the software conducted in the soft encryption unit 143. The cryptographic management unit 144 determines that the margin exists when the usage rate is lower than or equal to the threshold and determines that the margin does not exist when the usage rate exceeds the threshold.

When it is determined that the software usage rate has the margin (S1042: "with margin"), the base station 100 permits the encryption based on the software unconditionally with regard to the cryptographic class desiring the "immediate software encryption" (S1043). In a state in which the "immediate software encryption" is able to be conducted, the base station 100 permits, for example, the encryption with regard to the cryptographic class desiring the "immediate software encryption". For example, in the example of FIG. 9A, the base station 100 permits the cryptographic classes "1" and "4".

On the other hand, when the software usage rate does not have the margin (S1042: "without margin"), the base station 100 determines whether or not there exists a cryptographic class whose queuing is possible (S1044). Whether or not the queuing is possible is determined, for example, depending on whether the "queuing" of the received security parameter notification received by the base station 100 from the communication terminal 200 is "allowed" or "not allowed". The base station 100 determines, for example, whether or not there exists a cryptographic class for which the "soft encryption by the scheduling" is executable.

When the queuing is "allowed" (in S1044: "allowed"), the base station 100 determines whether or not the buffer usage rate has a margin (S1045). For example, the cryptographic management unit 144 calculates the usage rate of the cryptographic queue buffer 145 and performs the determination depending on whether or not the usage rate exceeds the buffer threshold.

When it is determined that the buffer usage rate is "with margin" (S1045: "with margin"), the base station 100 then permits the encryption through the software encryption having the scheduling (S1046). Herein, the base station 100 permits, for example, the encryption with regard to the cryptographic class for which the "soft encryption by the scheduling" is desired. In the example of FIG. 9A, the base station 100 permits the cryptographic class "2".

On the other hand, when it is determined that the buffer usage rate is "without margin" (S1045: "without margin"), the base station 100 does not permit the soft encryption but permits the hard encryption (S1047). Herein, since the usage rate of the cryptographic queue buffer 145 exceeds the buffer threshold, the base station 100 does not permit the "immediate software encryption" and the "software encryption by scheduling" but permits the encryption with regard to the cryptographic class for which the "encryption based on the hardware" is desired. In the example of FIG. 9A, the base station 100 permits the encryption for the cryptographic class "3".

On the other hand, when the queuing is "not allowed" (S1044: "not allowed"), the base station 100 permits the encryption based on the hard encryption (S1047). Herein, for example, when the software usage rate is also without margin (S1042: "without margin") and the cryptographic class whose "the queuing" is allowed does not exist, the base station 100 permits the encryption for the cryptographic class for which the "hard encryption" is desired. In the example of FIG. 9A, the base station 100 permits the cryptographic classes "4" to "6".

When the base station 100 performs the above-mentioned processing for the respective service types, the base station 100 transmits the security parameter notification to the communication terminal 200 (S1049).

For example, as in S15 of FIG. 7, when the software usage rate has the margin when the security parameter request is received (for example, S1042 of FIG. 12: "with margin"), the base station 100 permits the cryptographic class indicating the "immediate software encryption" (for example, S1043 of FIG. 12).

When the base station 100 receives the security parameter request in a state where congestion is occurring with regard to the "immediate software encryption" (for example, S30 of FIG. 7), the software usage rate does not have the margin (S1042 of FIG. 12: "without margin"). In this case, the base station 100 permits a cryptographic class whose queuing is "allowed" (S1045).

Furthermore, for example, when the congestion state in S50 of FIG. 8 occurs, the buffer usage rate also does not have the margin (S1045 of FIG. 12: "without margin"), the base station 100 permits encryption for which the "hardware encryption" is desired (S1047).

With reference to FIG. 11 again, when the parameter check processing is ended (S104), the base station 100 determines whether or not the reception of the packet data to be encrypted (or decrypted) exists (S105). For example, the cryptographic management unit 144 performs the determination depending on whether or not the packet data including the cryptographic class in the header area is received from the selector 141.

When the packet data is received (S105: Yes), the base station 100 extracts the cryptographic class from the packet data (S106).

Subsequently, the base station 100 determines what the extracted cryptographic class is (S107). Since the cryptographic class is transmitted to the communication terminal 200 as the security parameter notification (S1049 of FIG. 12), the base station 100 performs the encryption in accordance with the cryptographic class received herein.

When the extracted cryptographic class represents the soft encryption (S107: "soft encryption"), the base station 100 permits the soft encryption unconditionally, and performs the "immediate software encryption" (S108).

When the extracted cryptographic class represents the software encryption by the scheduling (S107: "soft encryption+ schedule"), the base station 100 also stores the received packet data in the cryptographic queue buffer 145 (S109).

When the extracted cryptographic class represents the hard encryption (S107: "hard encryption"), the base station 100 further performs the "hardware encryption" (S110).

When one of pieces of processing in S108 to S110 is ended, the base station 100 reads out the packet data or the like if the packet data or the like is stored in the cryptographic queue buffer 145 and performs the software encryption (S111).

On the other hand, the base station 100 performs the processing in S111 when the reception of the packet data on which the encryption is conducted does not exist (S105: No).

Subsequently, the base station 100 updates the usage rate of the soft encryption (S112). For example, when the base station 100 performs the "immediate software encryption" in S108, the usage rate of the soft encryption in the soft encryption unit 143 changes. In S109 or S111, for example, the usage rate similarly changes when the "software encryption by scheduling" is conducted. The cryptographic management unit 144 thus measures the usage rate in a case where the soft cryptographic processing is conducted in S108 or S111, for example.

The processing then shifts to S104, and the base station 100 repeatedly performs the above-mentioned processing. The base station 100 ends the present processing after one of pieces of processing in S101 to S112 is conducted when the power supply is turned off, for example.

Finally, effects of the second embodiment will be described.

Although the hardware encryption is conducted by the hard encryption unit 151 in the base station 100, a security level for the encryption based on the hardware may be decreased as a crypt analysis technology progresses. In view of the above, the base station 100 is configured to download the updated cryptographic program, without updating the hardware, to perform the software encryption by the CPU 140 (for example, S10 of FIG. 7). This allows the base station 100 to apply the cryptographic algorithm securing a high level of security to the crypt analysis technology, without increasing cost caused by replacing the SECURITY 150 or the like. Furthermore, this allows the security of the base stations 100 already installed across the country to be continuously improved, thereby providing still safer communication environment against the security threat. Therefore, the communication system 10 is able to realize the higher security as compared with the security at the time of the installment of the base station 100.

In addition, the base station 100 or the communication terminal 200 assigns a cryptographic class for each service type, and it is possible to provide a different cryptographic algorithm for each service (for example, FIG. 9A, FIG. 9B, FIG. 10A, and FIG. 10B). For example, the base station 100 according to the second embodiment applies a cryptographic algorithm providing a high security level (for example, the AES) to the "confidential packet" or the like for which the security level is higher than the other services, and applies a cryptographic algorithm providing a low security level (for example, the DES) to the other packet data such as the "voice" (for example, FIG. 9B or the like).

The base station 100 is further configured to perform, for example, the "software encryption by scheduling" on a service type for which the real-time aspect is not used but a higher level of security is used as compared with the other services (for example, FIG. 9B). The processing of the encryption based on the software is equalized by this scheduling, and it is possible to apply the cryptographic algorithm providing high security to the above-mentioned service type (for example, the "confidential packet" including financial settlement information that includes the lower amount of data but is more important than the other data). In this manner, the communication system 10 can secure the security in accordance the service.

The base station 100 may be configured to perform the "immediate software encryption" or the "software encryption by scheduling" when the amount of packet data changes, for example, in a case where the communication terminal 200 is moved.

For example, when the amount of data received from the communication terminal 200 is increased and the software usage rate of the base station 100 exceeds a threshold, the base station 100 changes encryption processing from the "immediate software encryption" to the "software encryption by scheduling" (S30 or the like of FIG. 7). The base station 100 may also perform the "immediate software encryption" (S70 of FIG. 8) when the software usage rate becomes lower than or equal to the threshold as the amount of data received from the communication terminal 200 becomes lower than or equal to the data threshold. For example, in accordance with the amount of data transmitted from the communication terminal 200, the base station 100 may switch encryption processing between encryption based on the software and encryption based on the hardware.

Furthermore, when congestion occurs in the software encryption of the base station 100, encryption is performed between the communication terminal 200 and the remote node 600. Therefore, even when the security level becomes lower between the base station 100 and the security GW 300 than the other section, a high security encryption may be conducted as a whole between the communication terminal 200 and the remote node 600. This guarantees the high security between the communication terminal 200 and the remote node 600. In addition, since the encryption is conducted in the communication terminal 200 only in the above-mentioned case, the communication terminal 200 is not caused to regularly perform the encryption processing. Therefore, the communication terminal 200 may perform the minimum security processing, reducing the power consumption of the communication terminal 200 as compared with the above-mentioned case.

Other Embodiments

Figure 13A:
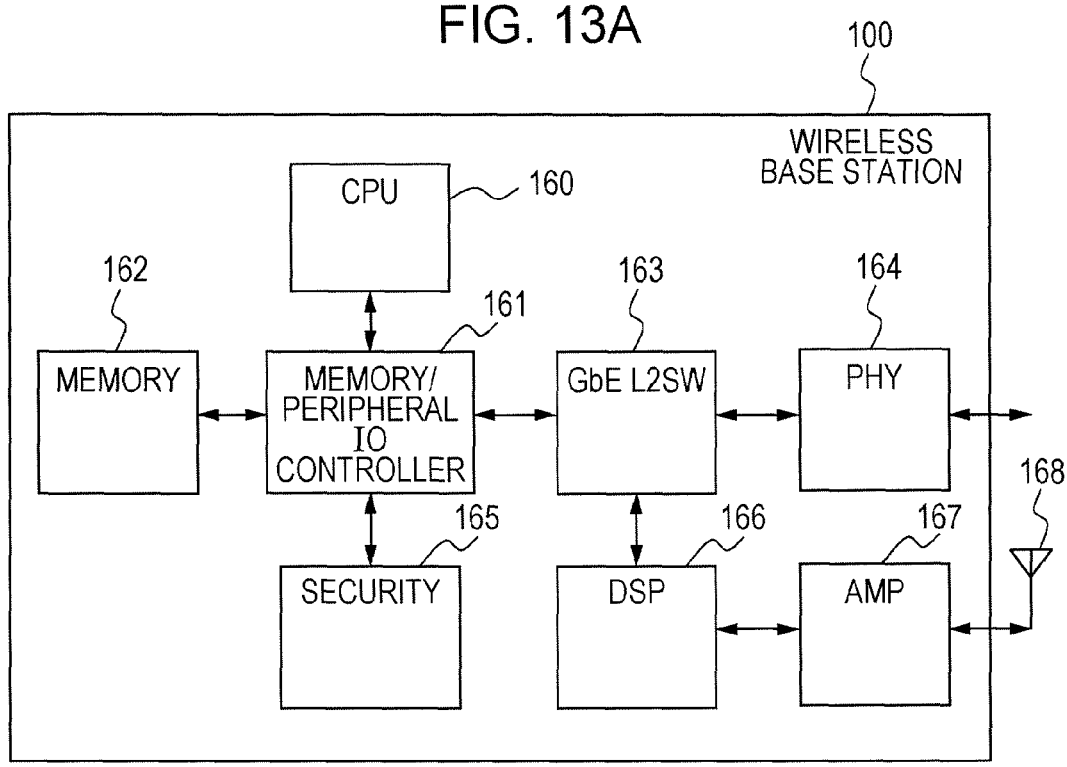
FIG. 13A illustrates a configuration example of a base station, according to an embodiment.
Figure 13B:
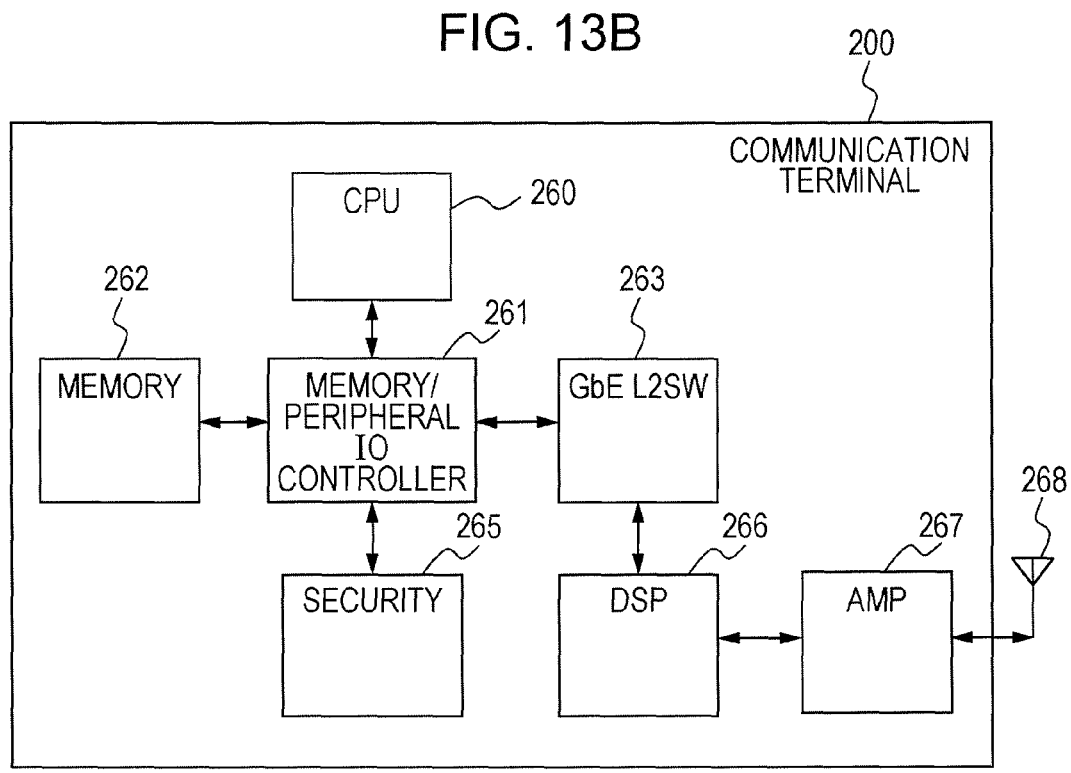
FIG. 13B illustrates a configuration example of a communication terminal, according to an embodiment.
Figure 14:
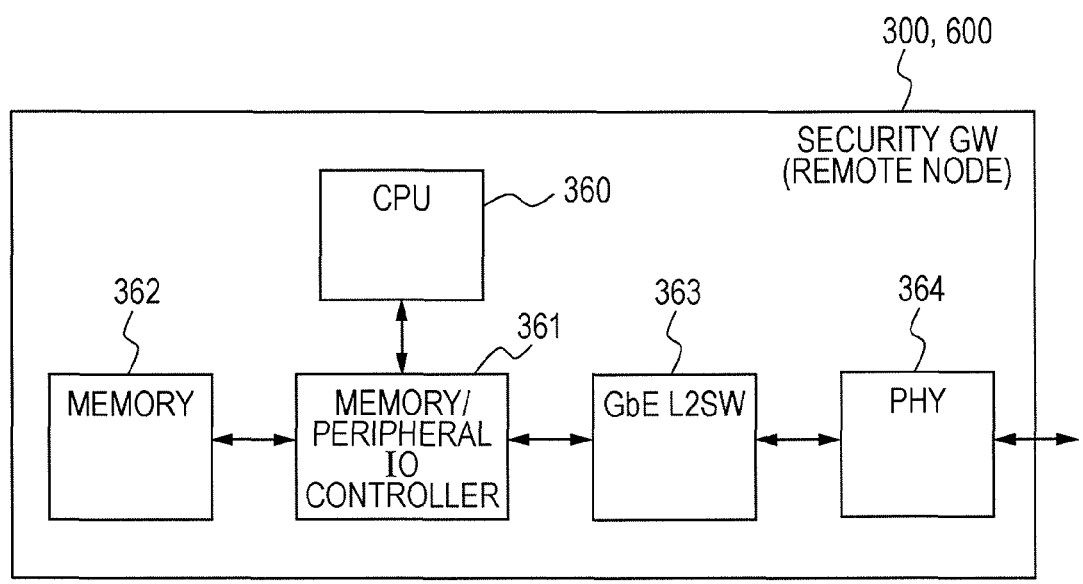
FIG. 14 illustrates configuration examples of a security gateway and a remote node, according to an embodiment.

Next, other embodiments will be described. FIG. 13A is a diagram illustrating a configuration example of a base station, according to an embodiment. FIG. 13B is a diagram illustrating a configuration example of a communication terminal, according to an embodiment. FIG. 14 is a diagram illustrating configuration examples of a security GW and a remote node, according to an embodiment.

In FIG. 13A, the base station 100 includes a CPU 160, Memory/Peripheral IO Controller (hereinafter, which may be referred to as "memory controller") 161, a Memory 162, a GbE L2SW (hereinafter, which may be referred to as "L2SW") 163, a PHY 164, a Security 165, a DSP 166, an AMP 167, and an antenna 168.

The CPU 160 corresponds, for example, to the software update unit 142, the soft encryption unit 143, the cryptographic management unit 144, the cryptographic scheduler 146, the call control unit 147, and the key exchange unit 148 according to the second embodiment.

The memory controller 161 corresponds, for example, to the selector 141, the software update unit 142, the soft encryption unit 143, the cryptographic management unit 144, the cryptographic scheduler 146, the call control unit 147, and the key exchange unit 148 according to the second embodiment.

The Memory 162 corresponds, for example, to the selector 141, the software update unit 142, the soft encryption unit 143, the cryptographic management unit 144, the cryptographic queue buffer 145, the cryptographic scheduler 146, the call control unit 147, and the key exchange unit 148 according to the second embodiment.

The L2SW 163 corresponds, for example, to the selector 141 according to the second embodiment.

The PHY 164 corresponds, for example, to the wired transmission and reception unit 111 according to the second embodiment.

The Security 165 corresponds, for example, to the hard encryption unit 151 according to the second embodiment.

Furthermore, for example, the DSP 166 corresponds to the baseband unit 121 according to the second embodiment, and the AMP 167 corresponds to the wireless transmission and reception unit 131 according to the second embodiment.

For example, in response to a security parameter request transmitted from the communication terminal 200 (for example, S15 of FIG. 7), the CPU 160 generates and transmits a security parameter notification including the permitted cryptographic class, based on the usage rate of the software encryption or the like (S16).

The CPU 160 also determines one of the "immediate software encryption", the "software encryption by scheduling", and the "hard encryption", based on the cryptographic class transmitted from the communication terminal 200 (for example, S107 of FIG. 11), and performs the processing in accordance with the determination (for example, S108 to S110).

In FIG. 13B, the communication terminal 200 includes a CPU 260, a memory controller 261, a Memory 262, an L2SW 263, a Security 265, a DSP 266, an AMP 267, and an antenna 268.

The CPU 260 corresponds, for example, to the class assigning unit 242, the cryptographic processing unit 243, the application 244, the call control unit 247, and the key exchange unit 248 according to the second embodiment.

The memory controller 261 corresponds, for example, to the transmission and reception unit 211, the baseband unit 221, the selector 241, the cryptographic processing unit 243, the application 244, the call control unit 247, and the key exchange unit 248 according to the second embodiment.

The Memory 262 corresponds, for example, to the transmission and reception unit 211, the baseband unit 221, the selector 241, the cryptographic processing unit 243, the application 244, the call control unit 247, and the key exchange unit 248 according to the second embodiment.

The L2SW 263 corresponds, for example, to the selector 241 according to the second embodiment.

The Security 265 corresponds, for example, to the cryptographic processing unit 243 according to the second embodiment.

Furthermore, for example, the DSP 266 corresponds to the baseband unit 221 according to the second embodiment, and the AMP 267 corresponds to the transmission and reception unit 211 according to the second embodiment.

For example, the CPU 260 assigns a cryptographic class to the security parameter and transmits the security parameter request including the cryptographic class to the base station 100 (for example, S15 of FIG. 7). When the security parameter notification is received from the base station 100, the CPU 260 also holds the permitted cryptographic class in the Memory 262, generates packet data including the cryptographic class in accordance with the service type of a packet to be transmitted, and transmits the generated packet data to the base station 100 (for example, S20 and S32 of FIG. 7 and S54 and S72 of FIG. 8).

In FIG. 14, the security GW 300 includes a CPU 360, a memory controller 361, a Memory 362, an L2SW 363, and a PHY 364.

The CPU 360 corresponds, for example, to the software update unit 342, the soft encryption unit 343, the cryptographic management unit 344, a cryptographic scheduler 345, the call control unit 347, and the key exchange unit 348 according to the second embodiment.

The memory controller 361 corresponds, for example, to the selector 341, the software update unit 342, the soft encryption unit 343, the cryptographic management unit 344, the cryptographic scheduler 345, the call control unit 347, and the key exchange unit 348 according to the second embodiment.

The Memory 362 corresponds, for example, to the selector 341, the software update unit 342, the soft encryption unit 343, the cryptographic management unit 344, the cryptographic scheduler 345, the call control unit 347, and the key exchange unit 348 according to the second embodiment.

Furthermore, for example, the L2SW 363 corresponds to the selector 341 according to the second embodiment, and the PHY 364 corresponds to the wired transmission and reception unit 311 according to the second embodiment.

The remote node 600 also includes the CPU 360, the memory controller 361, the Memory 362, the L2SW 363, and the PHY 364.

In this case, the CPU 360 corresponds, for example, to the cryptographic management unit 642, the application 644, the cryptographic processing unit 643, the call control unit 647, and the key exchange unit 648 according to the second embodiment. The memory controller 361 corresponds, for example, to the selector 641, the cryptographic management unit 642, the application 644, the cryptographic processing unit 643, the call control unit 647, and the key exchange unit 648 according to the second embodiment. The Memory 362 corresponds, for example, to the selector 641, the cryptographic management unit 642, the application 644, the cryptographic processing unit 643, the call control unit 647, and the key exchange unit 648 according to the second embodiment. Furthermore, for example, the L2SW 363 corresponds to the selector 641 according to the second embodiment, and the PHY 364 corresponds to the wired transmission and reception unit 611.

The other embodiments include, for example, the following embodiments. That is, in the second embodiment, an example has been described in which packet data is transmitted from the communication terminal 200 to the remote node 600. For example, the packet data may be transmitted from the remote node 600 to the communication terminal 200. In this case, the base station 100 transmits the security parameter notification to the security GW 300 and the remote node 600, and the remote node 600 transmits the packet data including the cryptographic class. The security GW 300 and the base station 100 respectively perform the encryption and the decryption, based on the cryptographic class. The communication terminal 200 generates response data in response to the received packet data, and transmits the response data to the remote node 600.

In addition, in the second embodiment, an example has been described in which the "immediate software encryption", the "software encryption by scheduling", and the "hard encryption" are conducted in the base station 100 and the security GW 300.

For example, the communication terminal 200 and the base station 100 may perform the above-mentioned cryptographic processing. In this case, the security of the communication path between the communication terminal 200 and the base station 100 may be secured.

The communication terminal 200 and the security GW 300 may also perform the "immediate software encryption", the "software encryption by scheduling", and the "hard encryption". In this case, the security of the communication path between the communication terminal 200 and the security GW 300 may be secured.

Furthermore, the communication terminal 200 and the remote node 600 may also perform the "immediate software encryption", the "software encryption by scheduling", and the "hard encryption". In this case, it is possible to secure the security of the communication path between the communication terminal 200 and the remote node 600.

For example, the communication apparatus 700 according to the first embodiment may be the communication terminal 200, the security GW 300, or the remote node 600, and the other communication apparatus 800 according to the first embodiment may also be the communication terminal 200, the security GW 300, or the remote node 600 that secures the security on the communication path with the communication apparatus 700. In the above-mentioned case, the respective blocks in the CPU 140 of the base station 100 are provided in the communication terminal 200, the security GW 300, or the remote node 600, and the respective pieces of processing in the CPU 140 described according to the second embodiment are conducted in the communication terminal 200 or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A cryptographic algorithm execution method in a communication system including first and second communication apparatuses, the second communication apparatus comprising at least one processor and a hardware security block and being configured to perform encryption on data transmitted from the first communication apparatus by using a first or second cryptographic algorithm, or perform decryption on the data that has been encrypted using the first or second cryptographic algorithm, the second cryptographic algorithm being configured to be executed by the at least one processor and to provide a higher security level than the first cryptographic algorithm that is configured to be executed by the hardware security block, the cryptographic algorithm execution method comprising:

causing the first communication apparatus to assign first cryptographic classes to a parameter to be used for the encryption or the decryption by the second communication apparatus and to transmit data including one of the first cryptographic classes, that is permitted by the second communication apparatus, to the second communication apparatus, the first cryptographic classes being each configured to identify security parameters to be used for cryptographic processing and the security parameters including a type of service and queuing information for the data for the cryptographic processing, wherein the queuing information provides an indication as to whether the cryptographic processing is based on software or whether the cryptographic processing is subject to buffering; and causing the second communication apparatus to perform, upon receiving the data including the one of the first cryptographic classes, the encryption or the decryption on the data by using the first or second cryptographic algorithm, based on the one of the first cryptographic classes.

2. A communication apparatus configured to perform encryption on data transmitted from another communication apparatus by using a first cryptographic algorithm or a second cryptographic algorithm or performs decryption on the data that has been encrypted using the first or second cryptographic algorithm, the second cryptographic algorithm being configured to provide a higher security level than the first cryptographic algorithm, the communication apparatus comprising:

an encryption apparatus including at least one processor and a hardware security block, wherein the encryption apparatus is configured to perform, upon receiving the data including a cryptographic class, the encryption or the decryption of the data based on the cryptographic class, wherein:

the cryptographic class is configured to identify security parameters to be used for cryptographic processing, the security parameters including a type of service and queuing information for the data for the cryptographic processing, wherein:

the queuing information provides an indication as to whether the cryptographic processing is based on software or whether the cryptographic processing is subject to buffering; and the first cryptographic algorithm is configured to be executed by the hardware security block and the second cryptographic algorithm is configured to be executed by the at least one processor.

3. The communication apparatus of claim 2, wherein the hardware security block comprises an application specific integrated circuit (ASIC) configured to perform the encryption or the decryption by using the first cryptographic algorithm, and the encryption apparatus is further configured to receive the data including the cryptographic class and output the data, based on the cryptographic class, to one selected from a group consisting of the ASIC and the at least one processor.

4. The communication apparatus of claim 3, wherein:
the encryption apparatus further comprises a storage apparatus configured to store the received data; and
the encryption apparatus is configured to:
output, upon receiving the data including the cryptographic class, the data to one selected from a group consisting of the ASIC, the at least one processor, and the storage apparatus, based on the cryptographic class; and
identify the data stored in the storage and output the data to the at least one processor, when the cryptographic class indicates that the second cryptographic algorithm is to be used for the cryptographic processing and buffering of the data is to be performed.

5. The communication apparatus of claim 4, wherein the encryption apparatus is further configured to:
calculate a timing at which an amount of the data stored in the storage apparatus becomes lower than or equal to a predetermined threshold; and
identify at the calculated timing, the data from the storage apparatus and output the data to the at least one processor, when the cryptographic class indicates a scheduled cryptographic processing using the second cryptographic processing is to be performed.

6. The communication apparatus of claim 3, wherein the encryption apparatus is further configured to transmit, upon receiving a security parameter request including first cryptographic classes from the another communication apparatus, to the another communication apparatus a security parameter notification including second cryptographic classes for which the cryptographic processing is permitted, based on: a first usage rate of the at least one processor for the cryptographic processing performed using the second cryptographic algorithm, the first cryptographic classes, and a second usage rate of a storage apparatus configured to store the received data.

7. The communication apparatus of claim 3, wherein:
the encryption apparatus further comprises a storage apparatus configured to store the received data; and
upon receiving a security parameter request including first cryptographic classes from the another communication apparatus, the encryption apparatus is further configured to:
transmit a security parameter notification including second cryptographic classes for which the cryptographic processing based on the second cryptographic algorithm is permitted, when a first usage rate of the at least one processor for the cryptographic processing based on the second cryptographic algorithm is lower than or equal to a first threshold,
transmit the security parameter notification including third cryptographic classes for which the cryptographic processing based on the second cryptographic algorithm after buffering of the received data is permitted, when the first usage rate of the at least one processor exceeds the first threshold, the first cryptographic classes of the security parameter request received from the another communication apparatus include a cryptographic class requesting the cryptographic processing based on the second cryptographic algorithm after the buffering in the storage apparatus, and a second usage rate of the storage apparatus is lower than or equal to a second threshold, and transmit the security parameter notification including a cryptographic class for which the cryptographic processing based on the first cryptographic algorithm is permitted, when the first usage rate exceeds the first threshold, and the first cryptographic classes of the security parameter request exclude a cryptographic class requesting the cryptographic processing based on the second cryptographic algorithm after the buffering.

8. The communication apparatus of claim 2, wherein a value of the cryptographic class varies in accordance with each of types of services that are provided by the communication apparatus to the another communication apparatus.

9. The communication apparatus of claim 8, wherein each of the types of services includes at least one selected from a group consisting of: a transmission of a confidential packet, a transmission of a normal packet having a lower confidentiality than the confidential packet, a transmission of a packet including voice data, and a transmission of a packet including a video stream.

10. The communication apparatus of claim 2, wherein the cryptographic class comprises an identifier configured to identify a combination of: the type of service, one of the first and second cryptographic algorithms, a number of bits per unit time in which the cryptographic processing based on the first or second cryptographic algorithm is to be performed, and a condition as to whether cryptographic processing to be performed using the second cryptographic algorithm is to be executed after an elapse of a predetermined time period.

11. The communication apparatus of claim 2, wherein the encryption apparatus is further configured to:
receive a security parameter request including first cryptographic classes from the another communication apparatus;
in response to the security parameter request including first cryptographic classes from the another communication apparatus, transmit to the another communication apparatus a security parameter notification including second cryptographic classes for which the cryptographic processing is permitted; and
receive the data including one of the second cryptographic classes from the another communication apparatus.

12. The communication apparatus of claim 2, wherein the communication apparatus comprises a wireless base station, and the another communication apparatus comprises a communication terminal.

13. The communication apparatus of claim 2, wherein the security parameters further include at least one of: a cryptographic algorithm, a candidate, and a maximum rate.

14. The communication apparatus of claim 13, wherein the cryptographic algorithm comprises an Advanced Encryption Standard (AES) algorithm or Data Encryption Standard (DES).

15. The communication apparatus of claim 13, wherein the candidate comprises information on a candidate cryptographic class desired from the another communication apparatus.

16. The communication apparatus of claim 13, wherein the maximum rate comprises information on a number of bits with which the cryptographic processing is to be executed per unit time for each cryptographic class.

17. The communication apparatus of claim 2, wherein the queuing information is further configured to provide information as to whether the cryptographic processing is to be based on software after a predetermined time, or whether the cryptographic processing is subject to buffering and queuing when congestion of the cryptographic processing based on the software occurs in the communication apparatus.

18. A communication apparatus configured to transmit data to another communication apparatus comprising at least one processor and a hardware security block for cryptographic processing, the another communication apparatus being configured to perform encryption on the data using a first cryptographic algorithm or a second cryptographic algorithm, or perform decryption on the data encrypted by the first or second cryptographic algorithm, the second cryptographic algorithm being configured to be executed by the at least one processor and to provide a higher security level than the first cryptographic algorithm that is configured to be executed by the hardware security block, the communication apparatus comprising:

a class assigning apparatus configured to:
assign first cryptographic classes to a parameter to be used by the another communication apparatus, when the another communication apparatus performs the encryption or the decryption, the first cryptographic classes each configured to identify security parameters to be used for cryptographic processing and the security parameters including a type of service and queuing information for the data for the cryptographic processing, wherein the queuing information provides an indication as to whether the cryptographic processing is based on software or whether the cryptographic processing is subject to buffering, and
transmit, to the another communication apparatus, the data including the first cryptographic classes.

19. The communication apparatus of claim 18, wherein the class assignment apparatus is further configured to assign the first cryptographic classes to data received from an application running on the communication apparatus prior to generating a security parameter request including the first cryptographic classes for the data.

20. The communication apparatus of claim 19, wherein the communication apparatus is configured to generate the security parameters to be output to the class assignment apparatus, based on a user input to the communication apparatus.

21. A communication system comprising:
a first communication apparatus comprising at least one processor and a hardware security block for cryptographic processing; and
a second communication apparatus configured to perform encryption on data by a first cryptographic algorithm or a second cryptographic algorithm, or perform decryption on the data encrypted by the first or second cryptographic algorithm, the second cryptographic algorithm being configured to be executed by the at least one processor and to provide a higher security level than the first cryptographic algorithm that is to be executed by the hardware security block,
wherein:
the first communication apparatus is configured to:
assign first cryptographic classes to a parameter to be used by the second communication apparatus, when the second communication apparatus performs the encryption or the decryption on the data, the first cryptographic classes being each configured to identify security parameters to be used for cryptographic processing and the security parameters including a type of service and queuing information for the data for the cryptographic processing, wherein the queuing information provides an indication as to whether the cryptographic processing is based on software or whether the cryptographic processing is subject to buffering, and
transmit, to the second communication apparatus, the data including one of the first cryptographic classes, that is permitted by the second communication apparatus; and
the second communication apparatus is configured to perform, upon receiving the data including one of the first cryptographic classes, encryption or decryption by the first or second cryptographic algorithm, based on the one of the first cryptographic classes.

* * * * *